(12) United States Patent
Mackie et al.

(10) Patent No.: US 10,302,454 B2
(45) Date of Patent: May 28, 2019

(54) RETROFIT DEVICE AND METHOD OF RETROFITTING A FLOW METER

(71) Applicant: Olea Networks, Inc., Bee Cave, TX (US)

(72) Inventors: David Mackie, Austin, TX (US); Stefan Grefen, Nierstein (DE); Corey James Boelter, Round Rock, TX (US); Astrid Jaehde, Austin, TX (US)

(73) Assignee: Olea Networks, Inc., Austin, TX (US)

( * ) Notice: Subject to any disclaimer, the term of this patent is extended or adjusted under 35 U.S.C. 154(b) by 186 days.

(21) Appl. No.: 15/433,507

(22) Filed: Feb. 15, 2017

(65) Prior Publication Data

US 2017/0234709 A1 Aug. 17, 2017

Related U.S. Application Data

(60) Provisional application No. 62/295,287, filed on Feb. 15, 2016, provisional application No. 62/418,952, filed on Nov. 8, 2016.

(51) Int. Cl.

| | |
|---|---|
| *G01D 4/00* | (2006.01) |
| *G01F 1/56* | (2006.01) |
| *G01F 1/60* | (2006.01) |
| *G01F 1/075* | (2006.01) |
| *G01M 3/28* | (2006.01) |
| *H04Q 9/00* | (2006.01) |
| *G01M 3/24* | (2006.01) |

(52) U.S. Cl.
CPC ............ *G01D 4/008* (2013.01); *G01D 4/002* (2013.01); *G01D 4/004* (2013.01); *G01D 4/006* (2013.01); *G01F 1/075* (2013.01); *G01F 1/56* (2013.01); *G01F 1/60* (2013.01); *G01M 3/243* (2013.01); *G01M 3/2807* (2013.01); *G01M 3/2815* (2013.01); *H04Q 9/00* (2013.01); *H04Q 2209/60* (2013.01); *H04Q 2209/86* (2013.01); *H04Q 2209/886* (2013.01); *Y02B 90/247* (2013.01); *Y04S 20/50* (2013.01)

(58) Field of Classification Search
CPC .......... G01F 1/60; G01F 1/588; G01F 1/5861; G01F 1/0755; G01D 4/002; G01D 4/004; G01D 4/006; G01D 4/008
See application file for complete search history.

(56) References Cited

U.S. PATENT DOCUMENTS

| | | | | |
|---|---|---|---|---|
| 2007/0241930 | A1* | 10/2007 | Qureshi ................. | G01D 4/002 340/870.02 |
| 2015/0084785 | A1* | 3/2015 | Lesbirel ................ | G01D 4/006 340/870.02 |

\* cited by examiner

*Primary Examiner* — Paul M. West
(74) *Attorney, Agent, or Firm* — Egan Peterman Enders Huston

(57) ABSTRACT

A retrofit device and method of installing such a device for supplementing a legacy flow meter in a fluid pipe system. The retrofit device enhances the function of the legacy flow meter by providing a digital interface and means for error diagnostics and tamper detection. The retrofit device adapts to the mechanical and casing form factor design of the legacy flow meter, particularly a flow meter already installed, such as buried in the ground.

17 Claims, 15 Drawing Sheets

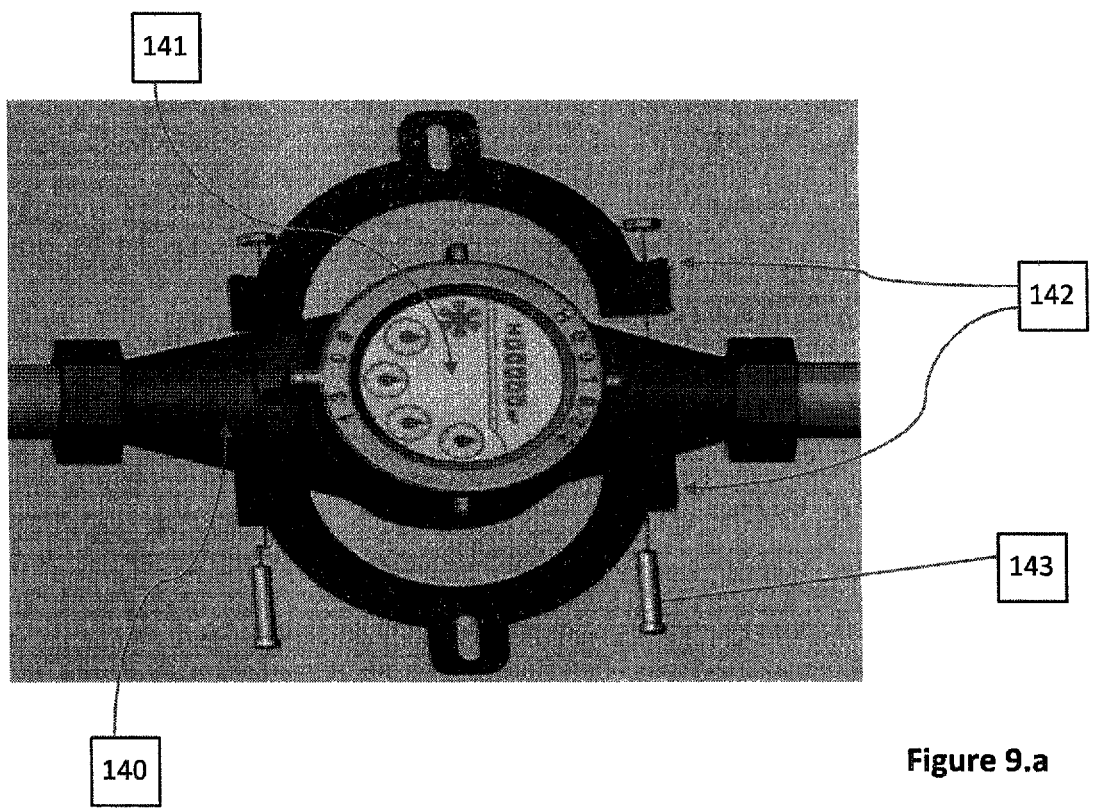
Figure 9.a
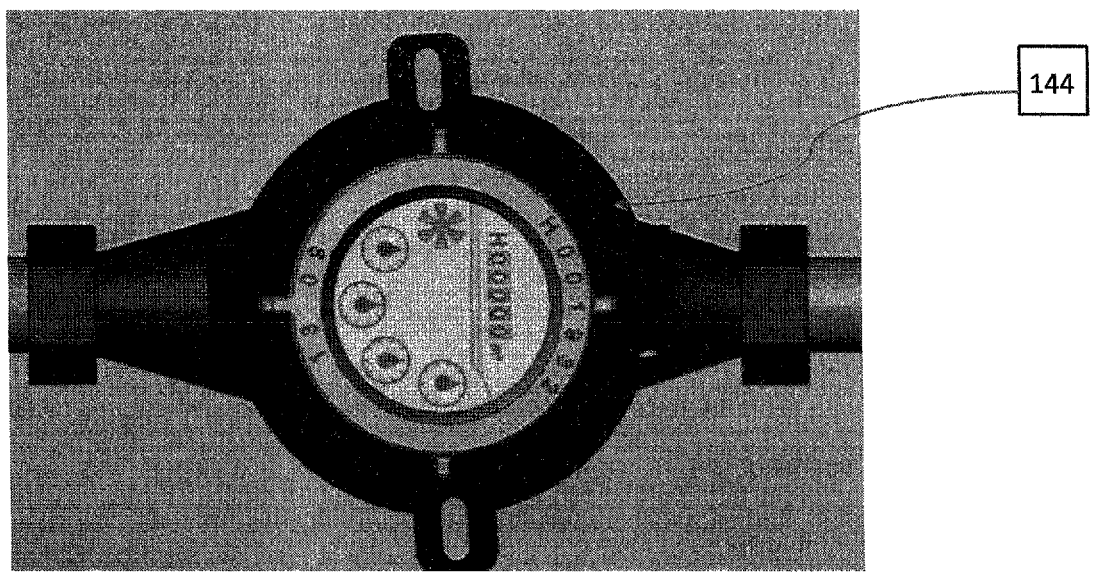
Figure 9.b

RETROFIT DEVICE AND METHOD OF RETROFITTING A FLOW METER

The present application claims priority to U.S. Provisional Application No. 62/295,287 filed Feb. 15, 2016 and 62/418,952 filed Nov. 8, 2016, which are incorporated by reference.

BACKGROUND OF THE INVENTION

Field of the Invention

In one form, the invention hereof presents a retrofit device for supplementing a legacy flow meter with a digital interface for control and data transmission. A primary embodiment of the invention includes a retrofit device for a legacy turbine flow meter used in a pipe system. Aside providing a digital interface, the presented retrofit device enhances the function of the legacy flow meter by adding means for error diagnostics and tamper detection. The presented design also solves various challenges arising from the requirement to adapt the retrofit device to the mechanical and casing form factor design of the legacy flow meter, particularly a flow meter already installed, such as buried in the ground.

Description of the Relevant Art

Many industrial or technical installations contain a substantial number of measurement or control devices that function on a purely mechanical basis. In many such installations a measurement or control device may have a part of its function realized by electrical or electronic components, but its capabilities for remote control or digital transmission of data are inadequate for integration into modern management systems, such as for centralized control, accounting, or data mining.

The term legacy device in general is applied herein to devices in industrial or technical installations, that are primarily mechanical and often do not accommodate recent technical advancements, or contemporary requirements. Typically, this means such installations are not enabled with a digital interface or with an outdated one, which prevents integration of them into modern systems for networking, automation, and data management. Legacy devices abound in industrial and technical installations, for instance in mining, agriculture, transport, or a utility system in an urban area. Examples of legacy devices are mechanical valves, flow or pressure meters, levers or shutoff devices in pipe installations, or recording devices for environmental data that function on a purely mechanical basis.

Such legacy devices ideally would be upgraded to newer designs, equipped with a digital interface and enabled for remote control, yet often there are outweighing reasons for their replacement. Such legacy devices often have a complex, mature design that is proven in terms of reliability and longevity. Also, replacing a legacy device with a new one that is digitally enabled and has equal functionality may not be economical to do. Aside from design and production costs, the expense of replacing a legacy device in a technical installation may be considerable. For instance, exchanging a flow meter or pressure valve in a pipe system may require a complete shutoff of large sections of the pipe infrastructure and be a substantial manual labor effort. Further, a legacy device may not be upgraded for reasons of compliance with safety or other standards, if a standards qualification is costly or nor a priority for a regulatory body.

Notwithstanding reasons to keep legacy devices in place, there are compelling reasons for their digital enablement, for remote control, monitoring and data transmission. For example, equipping flow meters in a pipe installation for remote, real time data collection provides new uses and diagnostic capabilities for the pipe system. For instance, by means of simultaneous data collection, leaks in the pipe system may be detected. Also, obtaining real-time usage data in a residential water supply infrastructure would allow for billing system with rates depending on the time of day.

Though desirable, retroactively equipping a legacy device for digital monitoring and data transmission has many challenges. Such design has many requirements, posed by the existing installation in terms of form factor and function. For instance, there are limitations in the placement of sensors, typically required for enabling a device with mechanical parts with a digital interface. A design to retrofit a legacy device for digital enablement often has the requirement that the enclosure of the legacy device cannot be opened or tampered with, or its mechanical parts not be affected in any manner. Also, the retrofit of a device with a digital interface should not obstruct the uses that device has been designed for.

SUMMARY OF THE INVENTION

The problems outlined above are addressed by one or more of the embodiments of the present invention. Broadly speaking the present invention includes a method of retrofitting an already installed legacy flow meter having a mechanical meter display, connecting a retrofit device to the flow meter, where the retrofit device has a camera positioned when connected to the flow meter to record the meter display. The method includes powering the retrofit device with an autonomous power source, transmitting the camera record periodically to a network; and receiving commands from the network to perform a function with the retrofit device. Preferably the function is to command the retrofit device to record the meter display, e.g. with a camera.

In a broad aspect the present invention also addresses a retrofit device adapted for installation to an autonomous, already installed flow meter having a mechanical meter display with a magnetic coupling, e.g. the magnetic coupling drives the meter display. The device includes one or more magnetic sensors positioned proximate the magnetic coupling and is operative for detecting the variation in the strength of the magnetic field of the magnet coupling. The device also includes a controller connected to the magnetic sensors to determine rotation of the magnetic coupling over a time interval and to compute flow volume through the flow meter for the time interval. A camera is positioned to record the meter display at the beginning and end of said time interval, whereby the flow volume of the flow meter can be determined from the camera record and compared with the computed flow volume by said controller.

In another aspect the invention includes a method of measuring fluid throughput through an already installed flow meter by observing mechanical components of the flow meter, where the flow meter has a meter display and a magnetic coupling. The method includes positioning one or more magnetic sensors proximate the magnetic coupling to sense rotation of the magnetic coupling and recording with the magnetic sensors a time series of signals indicative of the variation of strength of the magnetic field of the magnetic coupling. The method then analyzes the time series of signals to determine the number of rotations during a time interval; and calculates the flow volume of fluid flow through the flow meter over the time interval.

BRIEF DESCRIPTION OF THE DRAWINGS

Other objects and advantages of the invention will become apparent upon reading the following detailed description and upon reference to the accompanying drawings.

FIG. 9*a* is a exploded, plan view of an adapter ring being connected to a retrofit device to a legacy flow meter;

FIG. 9*b* is a plan view of the adapter ring of FIG. 9*a* connecting the retrofit device to the legacy flow meter;

DETAILED DESCRIPTION OF THE PREFERRED EMBODIMENTS

An Internet of Things device ("IoT device") is an example of a retrofit device as used in the present disclosure. Typically, an IoT device is a small, network capable embedded computing device that is designed to collect environmental data by means of sensors. An IoT device has a network connection, for participation in an infrastructure to coordinate its actions, either by a central point of control or in a system where many IoT devices act autonomously. An IoT device often is designed for participation in a decentralized network, such as a mesh network. Optionally, an IoT device has actuator capabilities, i.e., it has capabilities to control technical equipment.

An IoT device consist of one or more modules. A module is a component of a device with a physical enclosure, i.e. casing, that contains micro-boards, sensors, or other electronic components that are part of an embedded design. The modules of an IoT device contain the entirety of components that jointly provide its functions. Such components include, among others, batteries, solar panels, storage devices, for instance SSD drivers and cards, network adapters, antennas, and micro-boards containing Systems on a Chip, SoC, micro-controllers, sensors, network adapters and storage devices. At least one module contains a micro-board that provides for a control of electrical components in one or more modules, or alternatively, multiple micro-boards in multiple units might jointly provide for the control of the IoT device. A retrofit device typically contains various sensors, to gather environmental data. In a retrofit device, sensors may be used to observe the state of the legacy device. Further, a retrofit device may contain actuators, such as switching devices, to control technical equipment.

Figure 1:
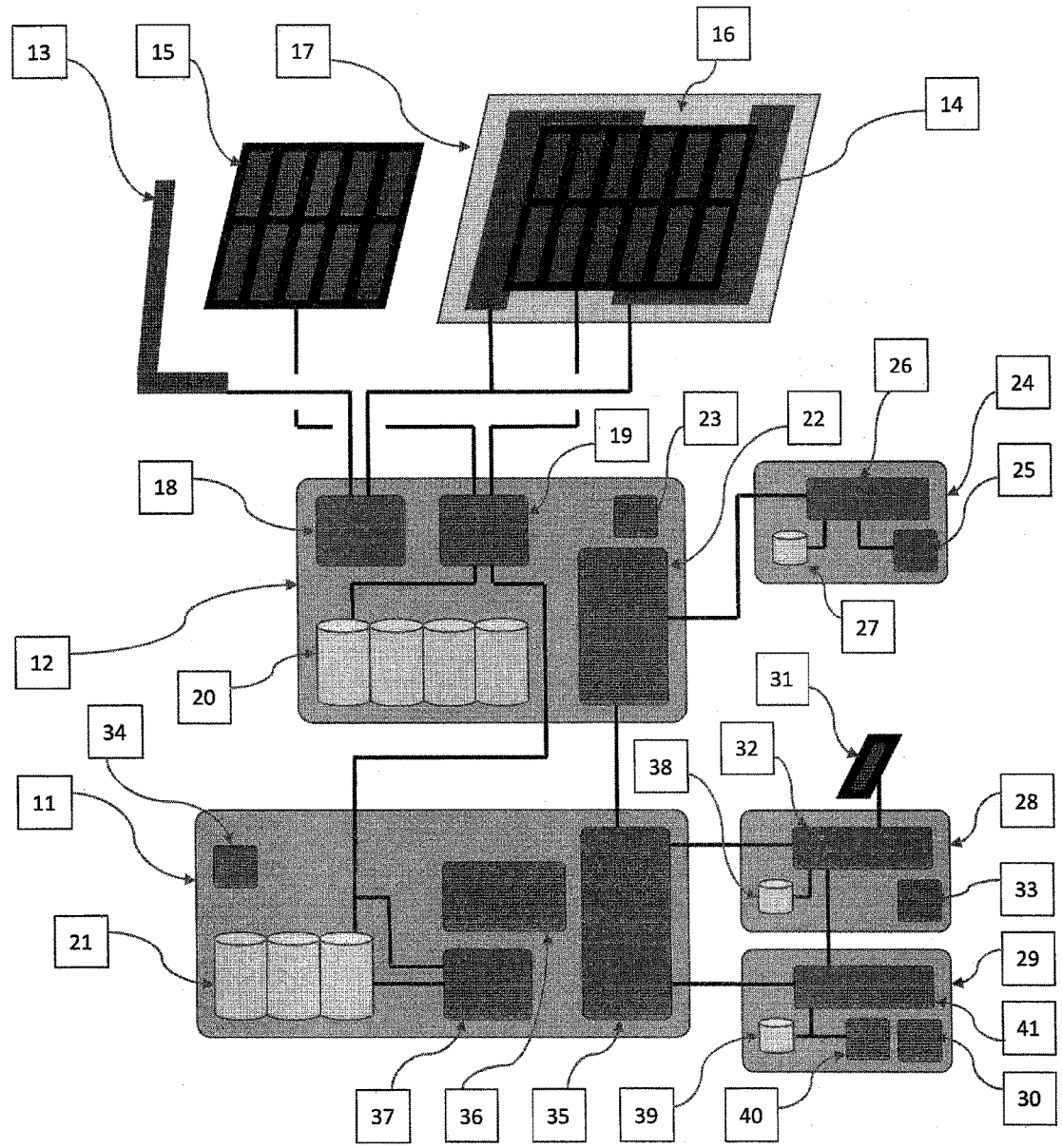
FIG. 1 is a block diagram of a device in accordance with the present invention in the context of an IoT device.

FIG. 1 shows an example of a component schematics of an IoT device, made up of multiple modules. An IoT device may consist of fewer or more modules than the one shown in FIG. 1, but at least one module. It may have all functions of the device shown in FIG. 1. and described in the following, or a subset of them, and in addition others, not mentioned here. The IoT device in FIG. 1. consists of modules, (11), (12), (24), (28), and (29). Each module contains one or more micro-boards, connected by pins, bridges, cables or similar. A module runs software or firmware; the software and firmware jointly run on all modules implements the functions of the device. Typically, at least one module runs an operating system, such as embedded Linux or a micro-kernel.

Each module contains one or more controllers. A controller is a functional unit that provides one or more services, for instance encryption, management of electrical power and hibernation state, or hosting an operating system. The function of a controller is realized either by hardware, such as a micro-controller that controls persistent storage, for instance an SSD card, by software or firmware that runs on a set of electronic components on one or more micro-boards, or by a combination of both. Multiple controllers may share the same hardware units on a micro-board. For instance, a micro-controller may perform multiple function, such as power management and sensor control, or a System on a Chip, SoC, may perform encryption and host the operating system. Two controllers, residing in separate modules, may act cooperatively to provide a function.

FIG. 1. shows controllers typically required in an IoT device, though an IoT device may implement further ones or not require all that are shown in FIG. 1. Module (11) contains controllers (35), (36) and (37). Controller (35) may implement communication with other components, (12), (18), and (29). Controller (36) may implement encryption and controller (37) may manage the charge state for the batteries, (21), of component (11).

A module may contain one or more sensors. In FIG. 1, module (11) contains a set of sensors, (34), module (12) contains a set of sensors, (23), module (24) contains sensor set (25), module (28) contains sensor set (33) and (29) contains sensor sets (30) and (40). Each set of sensor may contain zero or more sensors, or various types. For instance, sensor set (25) may contain pressure and temperature sensors. A given sensor of a sensor set may be controlled by one or more controllers. For instance, in module (11), a sensor of the set of sensors (34) may be controlled by one or more of the set of controllers made up of (35), (36), and (37). In FIG. 1, connections between controllers and other items, such as sensors or batteries, are shown when it is required to highlight their function. For instance, for module (11), a connection between (37) and batteries (21) is shown. Whereas controller (35) may interact with controllers (36) and (37), and sensors (34), yet no connection of (35) to the latter is shown.

Module (12) contains controllers (18), (19), and (22). Controller (18) controls antennas (13) and (14) and implements one or more functions for network communication, such as a cellular modem, an Ethernet adapter, or a wireless adapter that runs one or more wireless protocols, for instance cellular LTE, ZigBee, USB, Bluetooth, BLE, or Wireless 802.11. Controller (19) may be a charge controller for the batteries, (20) of module (12), and also for batteries (21) of module (11). Controller (19) is connected to two solar panels, (15) and (16). Alternatively, not shown here, controller (19) may be connected to the electric grid. An antenna or solar panel may be a standalone unit, (13) or (15), or contained in an enclosure. For instance, (17) is an enclosure that contains a solar panel, (16) and two antennas, one of which is (14). An antenna, solar panel or enclosure containing both may as well be integrated into a module. For instance, (13), (14), or (17) may be integrated into the casing of module (12). Controller (18) may as well implement a network protocol stack, such as TCP/IP, and security functions, for instance encryption or a block chain based protocol for auditing purposes, as described in "System and Method for Data Management Structure Using Auditable Delta Records in a Distributed Environment," application Ser. No. 15/367,873, filed Dec. 2, 2016 (incorporated by reference).

A module is connected to one or more other modules by means of a network connection, for communication to coordinate actions and data transfer. The network connection between two modules may be of any architecture suited for use in connections between micro-boards, for instance USB, Ethernet, Wifi 802.11, ZigBee, Bluetooth, BLE, Near-field communication, NFC, or RF signaling. In FIG. 1, a network connection between two modules is depicted as a connection between controllers belonging to these modules. For instance, controller (22) implements communication with other modules, (11) and (24). Controller (35) of module (11) is connected with controller (22) of module (12). Module (29) has a network connection with modules (11) and (28). In a device that contains these components, the connection between (11) and (28) or between (28) and (29) may be USB, Ethernet, Bluetooth, or BLE. Assuming controllers (32) of (28) and (41) of (29) need to communicate occasionally to coordinate actions, (28) and (29) may also communicate by means of an RF based protocol.

Modules (24), (28) and (29) are auxiliary modules, for instance used to control sensors, containing components that cannot be integrated into modules (11) or (12). The requirement for an auxiliary module in the design of an IoT device sometimes arises from conditions at the install site. For instance, due to spatial constraints it may not be possible to place all components of a device into a common enclosure. Also, functional requirements may dictate placing a sensor in a distance to other sensors, or at a location where other modules of the device cannot be placed. For instance, module (24) may contain one or more vibration sensors, in set (25), that need to be in close contact with a pipe of a water supply infrastructure, to detect vibration, whereas another module of the IoT device needs to be mounted in proximity to a flow meter, hence sensors (24) require a separate module. Controller (26) belonging to module (24), may control the operation of sensor of (25), process signals recorded by them, and communicates with controller (22) by means of a network connection.

Auxiliary modules may have their own power source, such as batteries, solar panels, or sensors that are used for energy harvesting. For instance, module (28) contains a solar panel, (31), used to recharge its battery, (38), for which controller (32) performs charge control functions. Module (29) may contain a piezoelectric vibration sensor, in set (40), that generates energy which is used to recharge its battery, (39), controller (41) performing charge control.

A module may not have a battery but receive its energy by means of a power supply connection from another module. For instance, module (11) or (24) may not contain battery (22) or (27) respectively, but receive power by means of a power connection, such as a DC line or USB cable from module (12).

Figure 2:
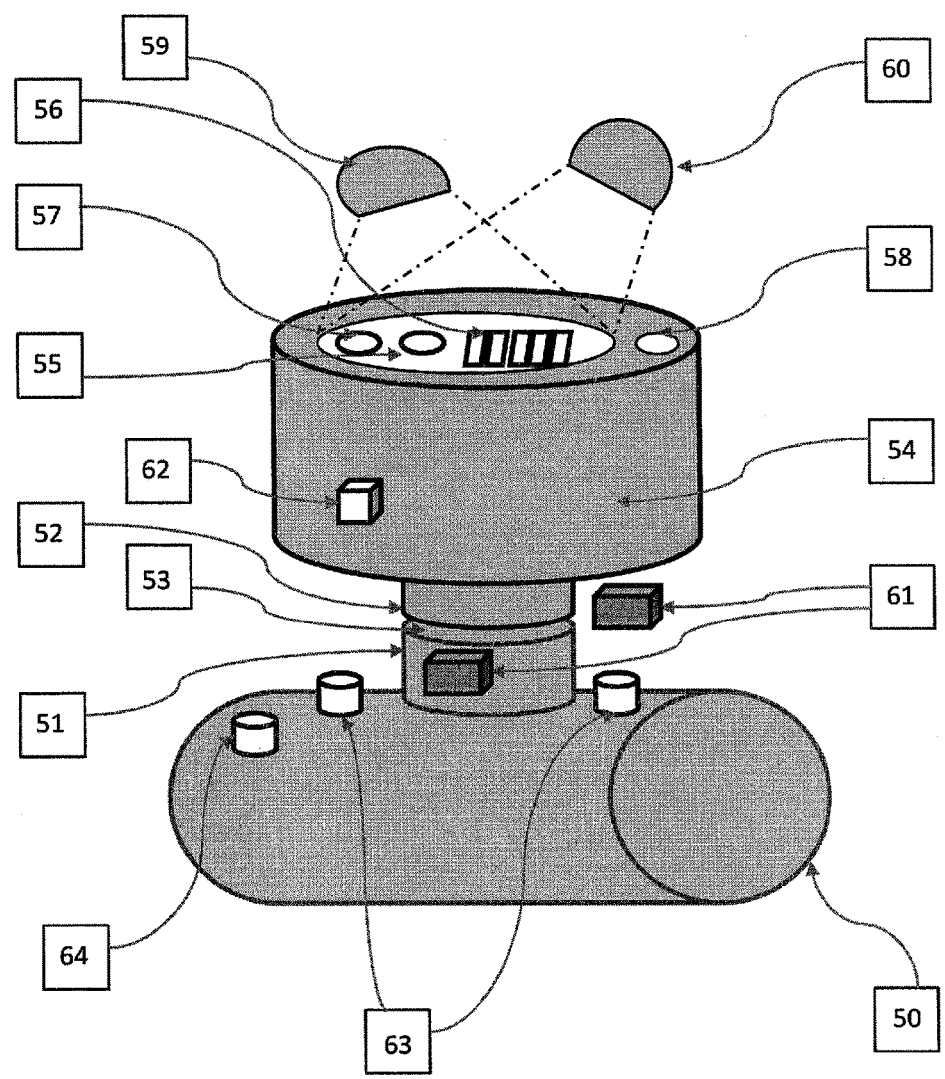
FIG. 2 is a schematic of a legacy flow meter with components in accordance with the present invention shown in general relation.

FIG. 2 depicts a turbine flow meter (48). A turbine flow meter (48) measures the current rate of flow of a gas or liquid in a pipe by means of the rotation of a turbine that is immersed into the transported medium. The rotation speed of the turbine varies with the speed of the medium, and the rotation count per time unit is translated into a flow volume for that time unit. The turbine flow meter design is widely used for meters in pipes that transport gas or liquids of low viscosity, such as oil, water, or wastewater, or liquids occurring in chemical industries or aerospace. Turbine flow meters can be used to measure flow volumes ranging from large ones, occurring in oil or gas transport pipelines, to small ones, such as residential water pipelines, or, even for pipes of smaller diameter in industrial installations. A flow meter typically displays the cumulative throughput, that is flow volume units that passed the pipe since installation of the flow meter, or since its last reset. It also may display the rate of throughput, which is equivalent to the first derivative of the function that models the cumulative throughput.

A turbine flow meter (48) typically consists of two disjoint components, an external component and one that is integrated into the pipe. In FIG. 2, the casing of the external component is made up of (52), (54), and (55), and (51) belongs to the component that is integrated into the pipe. Riser (51) is the exterior casing, which is joined to a pipe segment, (50), and thus part of the envelope of the transported medium. Riser (51) is the casing of the turbine pickup. The turbine pickup is an apparatus that provides for the translation of the rotation movement of the turbine into a signal that can be observed externally to the component that is integrated into the pipe. The transmitted signal typically is the strength of a magnetic field, which is used as a power source for a measuring device or observed by a measuring device. In a turbine flow meter that functions partially or entirely mechanically, the magnetic field generated by the turbine is used to power a gearbox, that is situated inside casing part (54). Power transmission occurs by means of a magnet that is placed close to the turbine pickup and connected to the gearbox. In FIG. 2, that magnet is enclosed in casing part (52). The two magnets, the one belonging to the turbine pickup situated in riser (51), and the other in casing (52), together constitute the magnetic coupling. The two casing parts, (51) and (52), are closely aligned, typically by surface contact. In FIG. 2, for better illustration, this alignment, (53), is shown with a spacing between parts.

The meter display, (55), typically has a transparent cover, often made of glass or acrylic glass. The meter display contains one or more elements, typically a digit display, (56), showing the accumulated flow of the medium in numeric format, and possibly further elements, (57), showing other measurements, such as the current rate of throughput or water pressure.

In a turbine flow meter that functions entirely on a mechanical basis, (56) is a mechanically driven digit display and the gearbox (54) translates rotation movements of the magnet in casing component (52) into movements of the mechanically driven digit display via a magnetic coupling. If the turbine flow meter has electronic components, the digit display (56) may be an LED or LCD display. Also, a flow meter with electronic components may not contain a gearbox but translate the signal of the turbine pickup in (51) by means of magnetic sensors, to obtain the rotation speed of the turbine. The magnetic coupling of such flow meter may be made up of two magnets, one situated in (51) and one in (52), or (51) may contain a magnet and sensors are located in proximity of (51), typically in a casing component (52). The magnetic coupling of a flow meter that has electronic components thus also may be made up by a magnet and a set of magnetic sensors. A flow meter with electronic control elements may be capable of storing a history of measurement data, and have a digital interface, (58), to retrieve measurement data or state information about the device. (58) may be a network adapter and the flow meter may have capabilities for communication and data transmission by means of (58). For instance, (58) may be an RF, USB, ZigBee, Bluetooth, or BLE device, listening to signals, and in response may transmit a history of measurement data that have been recorded and stored. For instance, for a flow meter that works on an electronic basis, (58) in FIG. 2 may be an RF antenna, and respond to an RF signal by transmitting recent measurement data.

FIG. 2, in addition shows various elements, (59), (60), (61), (62), (63), and (64), that pertain to the functioning of the retrofit device that is presented in one embodiment of this invention.

A turbine flow meter (48) may underreport flow, which is tantamount to a failure of the flow meter. Several factors can cause this, for instance attempts to tamper with the device or conditions in a pipe system may cause wear and a premature failure of parts. In more detail, the following conditions may cause an underreporting of flow:

Misalignment or deformation of components belonging to the magnetic coupling, which is housed in (51) and (52) of FIG. 2, may cause an incorrect transmission of the rotation speed of the turbine to the external component. For instance, the surface of the magnetic coupling, (53), may have been inadvertently damaged or deformed, or (51) and (52) are not properly aligned because of debris.

Backpressure in a pipe is a condition where the expected pressure gradient between two measurement points is reversed, the opposite of the expected. Backpressure leads to a reversal of flow direction, which puts stress onto the mechanical parts of a turbine flow meter, leading to sudden or gradual failures. Gears in the gearbox, contained in (54), might slip, or break, causing a transmission loss between the turbine and a display element, (56), or (57). The advent of backpressure itself is an important event to detect.

The digit display, (56) or a mechanical display element, (57), may fail, caused by wear or as consequence of water backpressure. In meter with a digital interface, a failure of electronic components, or batteries, may cause an incorrect display of internal representation of accumulated flow.

Debris or build-up of sediment, such as calcium or salt, may cause damage to the turbine.

A Register in the gearbox (54) may become blocked.

Tamper attempts, such as blocking the magnetic coupling with a magnet may reduce the rotation count transmitted to the element of the magnetic coupling that is contained in (52), and also cause damage to the turbine or magnetic transmission.

To determine that a flow meter is underreporting, one needs to either remove the meter from its installation site for testing in a laboratory, or insert measurement devices before and after it into the pipe where it is installed. Both methods are labor intense and require an outage. They are economic to do only if one knows with high confidence that the rate of underreporting for a given flow meter lies above a certain threshold. This is often difficult to determine. For instance, if a flow meter in a municipal water utility starts reporting lower water usage than before, this may not be due to a defect developing gradually, caused by conditions cited herein, but just be due to increased awareness for water savings by a consumer. Also, a pipe infrastructure tends to develop numerous small leaks as is ages. While finding these leaks is a task that is separately of importance, such leaks further complicate the identification of meters, for which an estimate of underreporting can be made with high confidence. Water utility companies assume revenue losses due to underreporting meters to be in a double digits percentage range. Yet, the costs for identifying underreporting flow meters are high.

Presently many efforts are underway to replace residential water meters with so called smart meters. A smart meter is a digitally enabled flow meter, that presents the measured throughput in digital format and is enabled for integration into a network and central management. Adoption of smart meters technologies though is slow for several reasons, one of them being the lack of maturity of many aspects of IoT technologies. A legacy flow meter, working on a purely mechanical basis, often has a life expectancy of 15 years or more. Many electronic components in IoT device fall short of these lifetimes, more so if deployed outdoors, in harsh climate conditions. For instance, a rechargeable Lithium-ion battery has an expected lifetime of three years in hot climates. Using rewriteable SSD memory storage requires careful design, to avoid premature wear. Immaturity of IoT technologies is one of the main reasons for the slow adoption of smart meters. The cost versus benefit analysis presently is not in favor of them.

Equipping a legacy flow meter with a retrofit device in accordance with some embodiments of the present invention is a solution for supplying flow meters with a digital interface and networking capability that reduces the adoption costs for smart meters. Retrofitting a flow meter avoids the costs associated with replacing a flow meter that requires interrupting a pipe and also reduces the risk associated with the introduction of new technology. In case of a premature failure of a device, replacement costs are smaller, and, moreover, the legacy device that has been retrofitted, still in place, serves as a functional fallback option. This motivates the design of a retrofit device for a legacy flow meter.

A retrofit device in accordance with some embodiments of the present invention to supplements a legacy flow meter. Such device meets a business need for many pipe infrastructures. Functionally, it may have the following capabilities:

Autonomous operation: Flow meters often are located outdoors, in locations where a connection with an electric grid does not exist. Thus, a retrofit device needs to operate autonomously, without external power supply. Typically, it is assumed that such device may experience intermittent outages. For instance, if it is solar powered and has exhausted battery resources, it will go offline until the solar panels have recharged the batteries.

Digital representation of present state and measurement values: A legacy flow meter typically displays the cumulative throughput of the medium at the point of installation in the pipe. Additionally, it may display the current rate of throughput, intra-pipe pressure and further environmental data, such as ambient temperature. The retrofit device generates a digital representation of these measurement values. It is capable to do so frequently, on demand, and of storing a set of most recent measurement values.

Network interface: The retrofit device has one or more network adapters, for instance for cellular LTE, Wireless 802.11, Ethernet, ZigBee, Bluetooth, BLE, USB, or RF signaling. It is enabled to participate in a network architecture, such as an edge network or mesh network. It has sufficient energy resources to support the network bandwidth required for its operation.

Central and peer-to peer management: The retrofit device is enabled for management by a central point of control, the management infrastructure, and implements protocols for this. It also may be enabled for participation in a peer-to-peer protocol, for coordination of actions with other retrofit devices. For instance, the device many coordinate with the management infrastructure or other retrofit devices, called peer devices, to capture measurements for throughput in the pipe during a specified time interval.

Security and device identity: The retrofit device satisfies common security requirements for devices installed in insecure locations, outside the perimeter of a datacenter. For small devices that are deployed outdoors, establishing device identity is of crucial importance. A device may be stolen or replaced. It is required, that a management infrastructure can detect if a retrofit device has been exchanged. For instance, if retrofit devices are used in a municipal water pipeline to retrofit water usage meters at residential end points, tamper attempts such as two retrofit devices having been exchanged between the meters on which they are installed, need to be detectable. Further, the retrofit device needs to supports secure network connections, encryption, and secure auditing.

Introspection of the legacy device: The retrofit device is equipped with sensors to observe the function of the legacy flow meter and detect an incorrect functioning of the latter, caused by defect, environmental conditions or tamper attempts, as described above.

Beyond detecting incorrect function of the legacy flow meter, the retrofit device is capable to perform diagnostic actions, for instance detecting special conditions in the pipe, such as backpressure or accumulation of debris.

The retrofit device may collect auxiliary data that may be of interest to the operator of an installation, or to third parties. For instance, it may collect environmental data, such as air temperature or humidity.

A retrofit device having functions described herein can be used in an installation in a pipe system for data analysis, such as for water leak detection. Also, it can be used for predictive failure analysis for legacy flow meters, by inferring failure probabilities for devices not equipped with retrofit device from data gathered for devices that have been equipped with one. This further adds to the economic appeal of using retrofit devices to improve the accuracy of measurements in a pipe system with legacy flow meters.

In addition, a retrofit device should fulfill various requirements towards its casing and form factor design, to make its deployment in a pipe infrastructure economical. Different embodiments of the present invention propose various solutions for this, that address the following requirements:
Modular: Pipe infrastructures typically have various types for flow meters installed, of different brands, age and manufacturer. A retrofit device must be modular and adaptable for installation on multiple types of flow meters and environmental conditions at the site, for instance the length and intensity of daylight.

Adaptable to spatial constraints at the installation site: Flow meters often are located at sites with limited physical access. They may be situated in tight niches or manholes; which may require for instance the placement of solar panels in a distance to other components of the retrofit device.

Preferably, a retrofit device does not obstruct the manner of use a legacy device has been designed for, nor compromise its casing. For instance, if a legacy flow meter has a meter display, (55), a retrofit device should not obstruct it and prevent manual inspection of it.

FIG. 2 shows the schematics of an arrangement of sensors in proximity of a turbine flow meter (48), to observe its behavior and collect environmental data about the flow in the pipe (50).

One or more cameras, (59), (60), may exist, that take photographic images or videos of the meter display, (55), or sections or elements of it. Information about the state of the meter display (55) is extracted from those images or videos. For instance, by means of pattern recognition techniques, a numeric representation of the accumulated water usage may be determined from an image taken of digit display (56) of the meter.

Vibration sensors (62), (64) may be attached at various locations to capture vibration signatures. A vibration signature is a characteristic set of frequencies that is observable by a sensor attached to an object, in response to mechanical movements of the latter. For instance, water flow in a pipe generates movements of the pipe, that is characterized by a set of frequencies that can be observed by a vibration sensor. Depending on external conditions, such as water content in the surrounding soil, the vibration signature generated in response to mechanical movement of the pipe may vary. A range of vibration signatures is understood to be a set of vibration signatures, each of which may be possibly generated in response to an event that causes mechanical movement for a given object. For instance, a range of vibration signatures is associated with water flow in a pipe, and the specific observed frequency pattern determined, among others, by the material of the pipe, its length and geometric shape. Similarly, for a gearbox, activity of it, the rotation of its digits, will cause a specific range of vibration signatures, observable by a vibration sensor that is attached to the casing of the gearbox. In FIG. 2, (62) is a vibration sensor(s) that is mounted on the casing of the gearbox (54), and (64) is a vibration sensor that is mounted on the pipe (50).

Two or more magnetic sensors, (61), may exist, situated in proximity of the magnetic coupling, (53), to detect the movement of the rotating magnets in (51) and (52). The signals recorded by these sensors can be used as a rotation counter for the turbine, and to detect misalignment of the magnetic coupling, gear slippage or blocking, and attempts to tamper by slowing down the gear by attaching magnets nears the magnetic coupling.

Sensors (63) are inserted into the pipe to measure environmental conditions inside the water envelope, for instance water pressure or chemical properties, such as salt or calcium content of the water.

Sensors (64) are for the collection of further environmental data. For instance, (64) may include a vibration sensor attached to the pipe, to collect sonic signatures. (64) may as well be sensor to measure the ambient temperature or humidity.

The retrofit device has a component schematics as described in general for an IoT device in FIG. 1. and described herein incorporating the sensors described above, corresponding to sensors in FIG. 2. The retrofit device may contain all of the sensors (51), (52), (54) and (55) in FIG. 2. or a subset of them. For instance, at minimum a retrofit device may just contain one or two of the cameras (59), (60), or the set of magnetic sensors (61). The throughput in the flow meter could be determined either way, by photographic images of the meter display or keeping track of the rotation count observed by sensors (61). The retrofit device may have a decomposition into modules as shown in FIG. 1. or it may be made up of fewer or more modules.

In one possible design, module (11) may have a form factor that lends itself to an attachment to the exterior casing parts of the flow meter, (51), (52), (54) and (55) in FIG. 2. The sensor belonging to module (11), sensors (34) in FIG. 1, would correspond to the set of sensors made up of (59), (60), (61) and (62). They are mounted in the casing of module (11) of FIG. 1, at positions suited for each to fulfill its designated purpose. Module (12) contains controllers for battery management, (19) and communication (20). Alternatively, the design of the retrofit device may not contain a separate module (12), for controllers (18) and (19), and (11) may be connected to solar panels, 15), (16), and antennas (13), (14), and the function of (18) and (19) being performed by controllers hosted in (11).

A retrofit device for a flow meter may implement only a subset of sensors of the set made up by (59, (60), (61), (62), (63) and (64). A sensor of this set may be contained in any module shown in FIG. 1, (11), (12), (24), (28) or (29). Any number of auxiliary modules may exist to implement the functions of the retrofit device, none or also a number larger than three. In one possible design, auxiliary module (24) in FIG. 1. may house one of the sensors belonging to set (63) in FIG. 2, and the sensor sets (30) and (40) in auxiliary module (29), FIG. 1. may correspond to sensors belonging to set (63) and (64) in FIG. 2. Sensors of set (40) in FIG. 1. may be sensors of set (64). For instance, (40) may contain one or more piezoelectric vibration sensor, to capture sonic signatures for further processing and also be used to recharge battery (39).

If a legacy flow meter contains a digit display (56) as in FIG. 2, the retrofit device may determine the displayed throughput value by taking photographic images of it. One or more cameras may be used for this, in FIG. 2, two cameras are shown, (59), (60). Their lenses may not have the same focal length, and they may capture different sections or elements of the meter display, (55.), which aside (56) may include further elements, (57), for a visual display of other measurements and state of the meter. The photo images taken by one or more cameras are processed to obtain a digital representation of the objects captured by the cameras. Such digital representation may just be a compressed photo image, for instance in JPG format, or one or more photo images taken by one or more cameras would be processed further by means of image recognition techniques to obtain a numeric value for the measurements presented by the meter, typically the cumulative throughput and additional data, if present on meter display (55), for instance the current rate of throughput or intra-pipe pressure.

One or more cameras (59) and (60) may record videos of elements of meter display (55). For instance, a meter display often contains elements to show the rotation of a turbine by means of a needle display, to show minuscule flow activity. A camera may generate a video of the movement of a needle of such display.

More generally, the conversion of an image or video to a digital representation entails any post processing of the image or video, such as compression, or using pattern recognition techniques to extract the numeric value or the color a display shows, or quantitative analysis to determine percentages of image regions with a certain property, such as color or texture, or geometric characteristics such as angles of lines, or sets of geometric shapes, or their transitions or changes over time, or combinations of all aforementioned. For a video, it may entail performing pattern recognition on a sequence of images, and performing further analysis on obtained results, such as to establish a correlation between them. An example would be to determine the movement of a number in a digit display, or the jitter of a needle in a display.

A legacy flow meter that contains electronic elements might have an LCD or LED display for elements (56) or (57). Such display element may be permanently enabled or activated upon a signal, such as light shining on a photovoltaic element, that is integrated into the meter display (55), not shown in FIG. 1, or a signal received by antenna (58). A retrofit device in accordance with a preferred embodiment for such flow meter may generate photographic images or videos of (56) and elements of (57), if needed, activating display elements (56) or (57) before. For instance, the retrofit device, before activating camera (59) or (60), may send a signal to (58) or to a photovoltaic element to active (56) or (57). Alternatively, if the flow meter is capable of sending measurement data by means of network interface (58), the retrofit device may send a signal to (58) to obtain measurement data.

Figure 3:
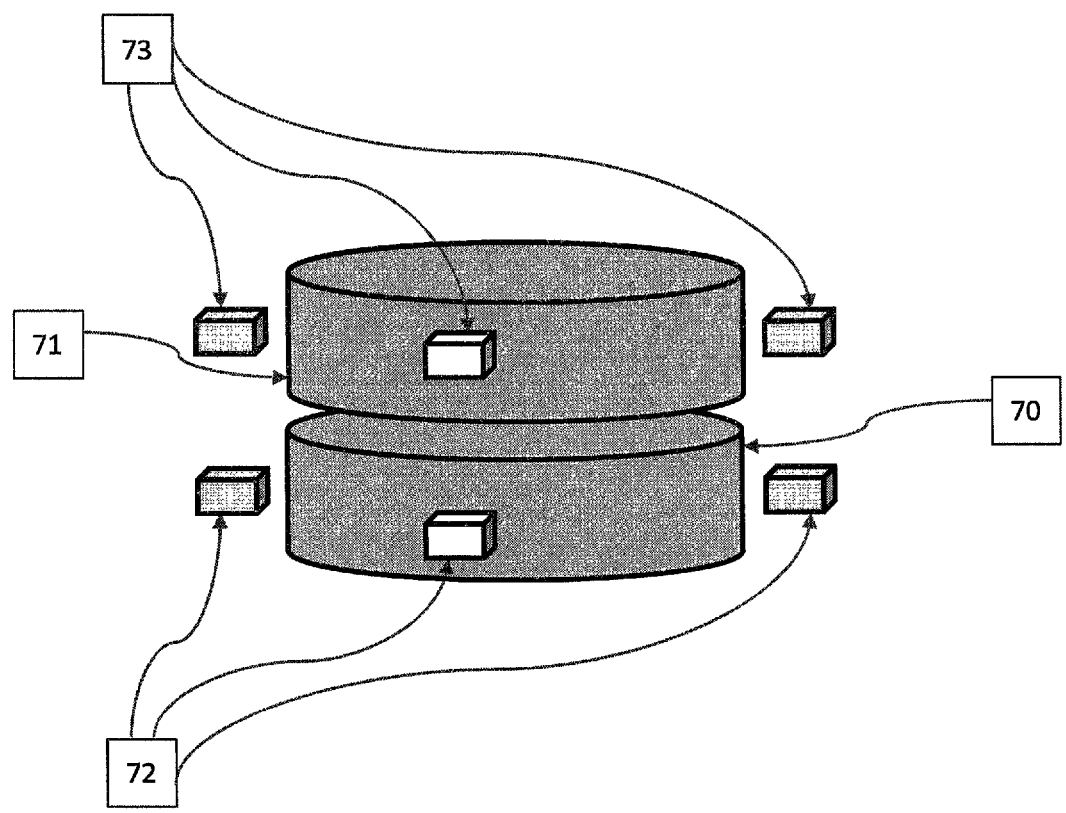
FIG. 3 is a schematic illustrating the operation of a magnetic coupling of a flow meter.

The use of magnetic sensors for the detection of movement of mechanical parts of machinery, such as rotation of a part or a trajectory of a reference point, is well established technology. FIG. 3. shows the magnetic coupling of a turbine flow meter that has a gearbox and adjacent sensors. (70) is the turbine pickup, and mechanically connected to the turbine. (70) is made of one or more magnets and contained in casing part (51) in FIG. 2. (71) is another magnet, that is mechanically connected to the gearbox. (71) is contained in component (52) of the exterior casing. Rotation of (70) will affect a rotation of (71).

Magnetic sensors are used to detect the rotation of the magnets in the magnetic coupling. (72) and (73) show sets of magnetic sensors, placed adjacent to the magnetic coupling, (70), (71). The set of magnetic sensors (61) in FIG. 1. corresponds to sensors in (72), (73). A retrofit device in accordance with a preferred embodiment may contain any subset of sensors in (72), (73) that is suited to implement its functions, and possibly a later number then shown in FIG. 3.

Two magnetic sensors, placed near the magnetic coupling made up of (70) and (71), in an axis that is not perpendicular to the rotational plane of the magnetic coupling, are suited to detect and count revolutions of the magnets that make up the magnetic coupling, and thus, the number of revolutions of the turbine. An algorithm that counts the number of revolutions per time unit, by means of signals generated by these sensors, uses standard methods of vector calculus, and requires a set of signals recorded sufficiently frequent to do so. The rotational plane is understood to be a plane in terminology of geometry, that is parallel to the adjacent circular parts of the surfaces of (70) and (71), shown in FIG. 3. Counting the number of revolutions of the turbine per time unit, including fractions of them, yields an approximation for the turbine speed. Assuming knowledge of the amount of volume of the medium, which needs to pass through the pipe to effect one rotation movement of the turbine, an approximation for the current rate of throughput is obtained. Counting the turbine revolutions during a time interval yields the cumulative flow during that time interval.

For instance, in FIG. 3, the signals of any two sensors, either belonging to set (72) or (73), may be used in the determination of rotation speed of the magnetic coupling, by means of vector calculus. Alternatively, a sensor of set (72) and one of (set (73) may be used to generate a set of signal from which to detect rotation of the magnetic coupling. For any two sensors used, it is assumed they are not aligned in a line that is orthogonal to the rotational plane.

The power transmission between magnets (70) and (71) may not work accurately due to inertia or resistance of mechanical components connected to (71). For instance, a jammed digit in the gearbox contained in (54) may cause a total blockage of movement of (71) or introduce friction that is sufficient to cause a difference in the rotation count of (70) and (71) while the turbine is rotating. Such condition can be detected analyzing the signals generated by two sensors, each belonging either to set (72) or (73), that are not aligned in a line that is orthogonal to the rotational plane of the magnetic coupling.

Another condition that may cause a difference in rotation speed between (70) and (71) is a geometric misalignment of (70) and (71). For accurate transmission of the rotation count, the adjacent circular parts of surfaces of the two magnets need to be aligned in parallel, within small tolerances. If the two surfaces are misaligned, outside tolerances, the magnetic coupling may not be strong enough ensure an accurate transmission of the rotation movement. In that case, inertia of (71) and mechanical components (71) is connected to, and for instance energy loss due to friction in the gearbox, may cause the rotation count of (71) to be lower than the one of (70) while the turbine is moving. This condition can be as well detected analyzing the signals generated by two sensors, each belonging either to (72) or (73), that are not aligned in a line that is perpendicular to the rotational plane.

In designs of a retrofit device to detect differences in the rotation count of (70) and (71), more than two sensors may be used. FIG. 3. shows a possible placement of sensors; other arrangements and a number of magnetic sensors that is larger than the one shown in FIG. 3 may be used. A design will strive to minimize the energy footprint of the device. A number of sensors larger than two may be used to simplify vector calculations performed by the sensor processor associated with the magnetic sensors, to determine the rotation count and patterns of signals generated by the sensors that are indicative of differences in rotation speed of the two magnets or their geometric misalignment. Also, the magnetic sensors may be in an alignment than is different to the one shown in FIG. 3. For instance, the geometric position of a sensor may intersect with the rotational plane of the magnetic coupling.

Another condition that can be detected by a time series of signals generated by two sensors is a reversal of the direction of rotation of magnet (70), the pickup, caused by backpressure in the pipe. With a suitable geometric placement of sensors, the rotation direction of the magnetic coupling can be detected using two sensors.

An attempt to tamper by placing a magnet near the magnetic coupling, to slow down the rotation speed of the magnets, will lead to changes in the strength of the magnetic field. If a record is kept of values observed for signals corresponding to the strength of the magnetic field during normal operation, it can discern the scenario when strength of the ambient magnetic field has been altered.

The use of magnetic sensors for the detection of defects also is warranted in a retrofit device used for a legacy flow meter that has electronic components and for which the exterior part of its magnetic coupling may be made up of magnetic sensors instead of magnets. Conditions that lead to a malfunction of the magnetic coupling of a flow meter that works on a purely mechanical basis, such as a misalignment of the components of the coupling, reversal of flow direction, or tamper attempts using a magnet, will affect a flow meter with electronic components as well. Legacy flow meters that are equipped with magnetic sensors often do not detect aforementioned conditions. Thus, a retrofit device for such flow meter may contain magnetic sensors to observe the behavior of the magnetic coupling and perform an analysis of signals generated by its magnetic sensors similar to a retrofit device for a flow meter that works on a purely mechanical basis.

The retrofit device in accordance with a preferred embodiment may contain vibration sensors for several purposes. If the legacy flow meter contains a gearbox in casing component (54), the retrofit device may contain one or more vibration sensor attached to (54), such as sensor (62) shown in FIG. 2. Such vibration sensors may perform multiple functions. For instance, they may function as watchdog to wake up the device from a hibernation state when they detect a vibration signature that is indicative of movements in the gearbox, caused by flow in the pipe. The device then may capture images of elements of the meter display using cameras (59) or (60). One or more sensors (62) may also capture the vibration signature of the gearbox during turbine movement and transmit the signature to a controller that determines if it lies within the range of vibration signatures that is deemed indicative of normal operation for the device. If the vibration signature is not within that range, the controller may initiate sending a notification to the management infrastructure, to alert about a potential defect of the flow meter. A vibration signature observed by sensors (62) observed during gearbox activity also may be used for the detection of slow pipe leaks. A slow pipe leak is a miniscule loss of fluid caused by a small fracture in the pipe infrastructure. Slow leaks often are hard to detect. For instance, in a municipal water supply system, a slow water leak that is downstream from a water meter at a residential endpoint may be detected this way. At a residential endpoint, periods of inactivity are expected, when no water is used and thus no flow should be present. During such periods, a slow leak should nevertheless cause a miniscule movement of turbine and gearbox, causing a characteristic vibration signature emitted by the gearbox, observable by sensors (62).

One or more pressure sensors may be installed in the pipe in vicinity of the flow meter. Current technology permits the installation of such sensors into the pipe envelope with low costs. Such pressure sensors may be integrated into any of the modules (11), (12), (24), (28), or (29) in FIG. 1. Their sensor readings may be part of a comprehensive system for water leak detection. They also may be used for error analysis at a flow meter. For instance, sediments and debris may cause a blockage of the turbine and pipe, leading to an observable pressure gradient between two measurement points, or fluctuation of measured pressure at one point. This information may be used to determine a correct functioning of the turbine.

Further sensors may exist, measuring environmental parameters, such as temperature, humidity, or chemical properties of the transported medium. For instance, sensors (64) may include temperature sensors, and one of sensors (63), installed in the pipe envelope, may measure chemical properties of the transported medium, such as the salt content.

In FIG. 2 the cameras (59, 60) capture an image of the meter display (55) and generates a digital representation of the measurement presented by the meter display. Concurrently, two magnetic sensors (e.g. 61) are used to count revolutions of the turbine by means of the magnetic field generated by the magnets in the magnetic coupling. Assuming knowledge of gear translation of the transmission box, the number of revolutions per time unit of the magnetic coupling can be used to calculate measured water volume. If the value captured by the cameras (59, 60) and the one derived from the rotation count do not coincide, it is assumed that the meter has a defect affecting a component in the path of power transmission from the turbine to the digit display. For instance, the magnetic coupling may be misaligned or transmission blocked in the gearbox.

Many designs for legacy flow meters exist, distinguished by the laws of physics on which their operations are based, or mechanical design. Beyond turbine flow meters, the design principles of presented retrofit device can be applied to a class of flow meter types, that are all based on observing the movement of a mechanical part, often a rotation of that part, being driven by the medium as it passes through the pipe. Examples are paddle wheel and propeller flow meters, and positive displacement flow meters. These flow meter types have the same essential design like a turbine flow meter in that the moving mechanical part is driven by the medium transported in the pipe, and its movement transmitted by a signal, typically a magnetic field, that is observed by an external component, which translates the magnetic signals to display a cumulative or current rate of throughput, or both. The external component works on a purely mechanical or electronic basis, or a combination of both. What is common to these types of flow meters is that their components that are situated in the pipe envelope and also their external component have similar designs and operating principles, and thus are affected by similar failures. All methods of introspection that have been described for a turbine flow meter, such as the observation of the rotation count of the mechanic coupling and comparing a rate of throughput and cumulative throughput derived of it with the values obtained from the digit display, and the probing for mechanical failures using magnetic and vibration sensors, are applicable to these flow meter types and can be equally used in a retrofit device for a legacy flow meter of one of these types.

If a retrofit device in accordance with a preferred embodiment is installed in a location distant from access to the electric grid (autonomous), it will typically be powered by an autonomous power source, such as battery backed solar, and thus energy management is a concern. The operating system on the retrofit device may spend the majority of time in a hibernation state. A hibernation state may be implemented in various ways. It may entail the state of the operating system being inactive, with a snapshot of the operating system resident in memory or storage. A snapshot of an operating system is a representation of the state of memory and registers. Upon a wakeup signal, the snapshot is activated. Wakeup may be performed by a coprocessor that is resident on the same controller or by another controller. Alternatively, hibernation state may just entail a state of reduced activity, with a minimum set of threads and processes active and a subset of device drivers that are active at other times, being unloaded or suspended. The operating system will be activated periodically, such as to send it status or data by means of a network connection, or in case activity is detected for the flow meter. The wake-up may be performed by a controller after a time counter expires, or upon sensor activity. For instance, in FIG. 1, controller (35) may host the operating system. Controller (41) may server as state manager for controller (35) and periodically active the operating system. The sets of sensors (30), (40), connected to controller (41) may include a vibration sensor that is attached to the pipe or gear box, (62) or (64) in FIG. 1, or magnetic sensors (61). Upon detection of a vibration signature that is characteristic for water flow, captured by the vibration sensor, or rotation movements of the magnetic coupling respectively, controller (41) may wake up the operating system on (35).

A sensor processing unit consists of sensors and sensor processors. A sensor processor is made up of software or firmware to configure one or more sensors, control their operation, and process the signals generated by them. Such software and firmware may reside on multiple controllers, that may not all reside on the same module.

The tasks a sensor processor may perform in processing signals may be complex. Consider magnetic sensors (61) in FIG. 2. that periodically record the magnetic field adjacent to the magnetic coupling. Their sensor processor reads the signals generated by them and converts signals into data that represent a time series of vectors that model the strength of the magnetic field at measurement points. The value of a vector needs to be normalized with respect to the Earth's magnetic field. A sequence of vectors of a time series needs to be identified as a rotation movement of the magnetic coupling or a component of it, (70) or (71) in FIG. 3. The time series of signals generated by magnetic sensors, that is associated with a sequence of vectors that has been established to correspond to a full rotation or partial rotation of a certain angle, is used to identify rotation movements and speed from further signals generated by the magnetic sensors. A sequence of vectors of a time series associated with a rotation also can be used as a reference for a correct alignment of the magnets of the magnetic coupling, and signals of further recorded rotations be compared against them, to detect misalignments or infer the magnetic field may have been altered by a magnet in an attempt to tamper.

The tasks of a sensor processor may be cooperatively performed by software or firmware that resides on multiple controllers. For instance, if magnetic sensors (61) correspond to sensors (33) in FIG. 1. controller (32) may cache a set of signals recorded by (33) and convent them into a rotation count, performing vector calculus. (32) forwards the rotation count to controller (35) on module (11), that runs the operating system. A program may be active on controller (35) that maintains a database with rotation counts recorded by (33), and patterns of time series of vectors associated with a rotation. The program may communicate with the software or firmware that is active on (32), for instance to change control parameters for the sensors. The sensor processor of the magnetic sensors (33) is made up of the software and firmware that is active on (32) and (35) to cooperatively perform aforementioned tasks. In another embodiment, the sensor processor may run on controllers belonging to the same module. For instance, in FIG. 1, the magnetic sensors may be contained in sensor set (34), and controller (35) may perform all described functions of the sensor processor for the magnetic sensors.

A sensor processor also may communicate with controllers that perform other functions. For instance, if sensor set (40) contains a piezoelectric vibration sensor, its sensor processor, active on controller (41), may manage wakeup of the operating system that is active on (35). Upon detection of a signal recorded by the vibration sensor, the sensor processor may send a signal by means of a network or system bus interface to (35).

After attachment of the retrofit device in accordance with a preferred embodiment to a legacy flow meter, sensor processors typically require calibration, which entails an adjustment of parameters used by sensor processors in the interpretation of signals recorded by sensors. For instance, a sensor processor that converts signals generated by magnetic sensors into a rotation count, requires information which signal pattern corresponds to the expected flow direction in the pipe, and which is indicative of reverse flow. Some of these adjustments required for sensor processors, to interpret signals by sensors, may entail hardware configurations, such as setting hardware switches or setting up static configuration data. For others, it may not be possible to determine them before installing the retrofit device and observing the signals that are generated by a set of sensors in response to the operation of the flow meter and environmental conditions. These may be determined by means of learning algorithms and adjustment, possibly aided by a technician who performs the installation of the device. For a retrofit device for a turbine flow meter, calibration is required for the sensor processors of various sensors:

The vibration signature associated with flow in the pipe depends on weight, diameter and the material of pipe and flow meters, physical properties of the medium, such as viscosity, geological properties of ambient soil, pipe attachment points and ambient vibration signals. Thus, it may not be possible to pre-configure a sensor processor for a sensor that records the vibration signature in a pipe, such as sensor (64) in FIG. 2. The range of vibration signatures indicative of flow may be determined by a learning algorithm. Such learning algorithm would sample the flow in the pipe during time intervals when flow is established to occur by other means. For instance, if the sensor processor of the magnetic sensors is calibrated, information generated by it for the current rate of throughput can be used by a learning algorithm to determine vibration signatures that are characteristic for flow in the pipe. Vibration signatures are sampled for both states, that flow is detected in the pipe or not detected, to build a model of vibration signatures that are indicative of flow in the pipe.

The vibration signature of mechanical parts of the meter, such as a gear box contained in casing part (54) depends on the construction of the meter. Determining the range of vibration signatures associated with flow in the pipe may be performed similar to described herein.

Calibration of the sensor processor of magnetic sensors (61) is desirable for multiple reasons. First, the signal of any magnetic sensor needs to be normalized with regards to the direction of the Earth's magnetic field and strength of the magnets in the magnetic coupling. Also, the geometric position of sensors (61) relative to the magnetic coupling in (51), (52) may vary between flow meter types, and also for a given flow meter type the positioning may be determined by conditions at the installation site. Third, the rotation direction of the magnets in the magnetic coupling needs to be configured, and the amount of water flow per revolution of the turbine, if these values are not part of static configuration data of the sensor processor of the magnetic sensors, based on knowledge of the meter type on which the retrofit device is installed. The strength of a magnetic field associated with a rotation and throughput volume per rotation may be determined through calibration. The sampling algorithm run during calibration may derive the throughput volume per rotation by counting rotations for a time interval and calculating the throughput volume for that time interval by comparison with the throughput volume calculated from the difference of values for the cumulative throughput read at the beginning and end of the time interval on the digit display, (56), or obtained from the digital interface (58).

A camera (such as 59, 60 in FIG. 2) may be adjusted to use a certain focal length or time of lens exposure, and if the sensor processor of the camera as well controls lights, to illuminate the meter display, the light intensity may need to be adjusted. Both can be performed by a learning algorithm that analyzes digital image taken by the cameras.

If calibration is performed by a learning algorithm, the process of calibration for a sensor processor entails recording signals generated by a set of sensors, correlating them to known states of objects observed by the sensors, and adjusting a computational model that is used to determine the state of observed objects based on the signals generated by the sensors.

An observable state associated with a legacy flow meter is a value that models the occurrence of an observed event or an operational state, or a combination of one or more of both of aforementioned. An observed event models a condition that is external to the legacy device. For a flow meter, examples of an observed event are the state that a medium flows through the pipe, or the intra-pipe pressure pipe being above a threshold value. An operational state models a property of the legacy device's internal functioning. For a turbine flow meter, examples of an operational state are that the turbine is rotating, perhaps further specifying that the revolution count is within a given range, or that the transmission gear box is active, yet assumed to be defective.

An observable state is determined from a set of signals, $sig\_1, \ldots, sig\_n$, generated by a set of sensors, $S1, \ldots, SN$, of the retrofit device in accordance with a preferred embodiment. A signal $sig\_i$, generated by sensor $Si$, may be a point-in-time signal generated by the sensor, associated with a timestamp, or a series of signals generated by a sensor, each associated with a timestamp. For instance, $Si$ may be a magnetic sensor and $sig\_i$ a time series of signals. An observable state is then calculated by a set of functions, $f1, \ldots, fk$, and another function, $F$. A function is understood to be a function in programming language terminology sense, that takes a set of arguments as input and by means of an algorithm calculates a result. A function may for instance implement a vector analysis calculation. Each function $fi$, in its set of arguments includes a subset, or generally speaking all signals $sig\_1, \ldots, sig\_n$. A function $fi$ may have further arguments, $ti\_1, \ldots, ti\_ki$, that further determine the result that $fi$ calculates for a given set of input values $sig\_1, \ldots, sig\_n$. $ki$ is an index that is the number arguments of the set $ti\_1, \ldots, ti\_ki$. The observable state then is calculated by means of function $F$, that takes as input the results of functions $fi$ and determines a Boolean value from it, signifying whether the observable state has been present at the time during the time interval during which the sets of signals $sig\_1, \ldots, sig\_n$ had been generated, or not. The result of $F$ is assumed to be of Boolean type. It can easily be understood that the set of functions $f1, \ldots, fk, F$ can be replaced with another function, that takes $sig\_1, \ldots, sig\_n$, and all sets $ti\_1, \ldots, ti\_ki$ as input. The sets $ti\_1, \ldots, ti\_ki$, for $i=1, \ldots, n$ make up the tuning parameters for an observable state. They account for local environmental conditions that need to be considered in the computational model (given by $f1, \ldots, fk, F$) for the observable state. For instance, for a signal $sig\_i$ that is generated by a magnetic sensor, the set of tuning parameters $ti\_1, \ldots, ti\_ki$ may model adjustments that need to be done in the calculation of vector modelling the magnetic field, that takes into account the strength of the Earth's magnetic field. With described computational model, the calibration of a sensor processor associated with sensors $S1, \ldots, SN$ entails the determination of tuning parameters for an observable state. The sensor processor records signals $sig\_1, \ldots, sig\_n$, applies function $F$ that takes as input $sig\_1, \ldots, sig\_n$ and for each $sig\_i$ a set of tuning parameters $ti\_1, \ldots, ti\_ki$. Some of these sets of tuning parameters may be empty. A sensor processor may evaluate signals of its associated sensors for multiple observable states, having for each a dedicated computational model, a function Fj and tuning parameters $tj\_i\_1, \ldots, tj\_i\_ki$ for sig_i as described.

In one embodiment it is assumed that a modification of tuning parameters $ti\_1, \ldots, ti\_ki$, as described herein is of limited complexity. If it cannot be performed on the retrofit device, due to its limited computational resources, the retrofit device instructs the management infrastructure to perform the calculation and obtains the result from it.

For a flow meter, an example of an observable state and defining tuning parameters for it is the determination of the vibration signature associated with an observable state, here called WF_V, signifying flow in the pipe. For a set of sensors, $V1, \ldots, Vn$, flow will generate a vibration signature for each, according to a computational model used by the sensor processor associated with the set of sensors $V1, \ldots, Vn$. The vibration signature is, as explained, specific to properties of the medium, such as viscosity, and pipe material, size, geometry, and surroundings. sig_j is the signal generated by sensor V_j of the set $V1, \ldots, Vn$, sampled during a time interval. Function fj, taking as arguments sig_j, and $tj\_1, \ldots, tj\_kj$ is applied to the vibration signature. $tj\_1, \ldots, tj\_kj$ are tuning parameters for the observable state WF_V. fj may apply in its algorithm a frequency signal filter, that determines if signals in given frequency ranges have been observed by V_j, and may give as a result a numeric value. F=F_WF_V is applied to the results that each fj yields for a set of input values, sig, $tj\_1, \ldots, tj\_k$, and the result determines if the set of signals observed by sensors $V1, \ldots, Vn$ corresponds to water flow in the pipe, i.e. if observable state WF_V holds. It is easily understood that the tuning parameters for observable state WF_V, parameters $tj\_1, \ldots, tj\_k$, allow the adjustment of the result calculated by function fj, to account for conditions specific to the environment of the flow meter. For instance, they may, among others, in the determination if a vibration signature is indicative of flow of the medium, specify to discard certain frequencies, that may be generated by other sources in close location to the flow meter.

Another example of an observable state, called WFT, may describe that water flow is present and no errors are detected for the turbine. This observable state would process the signals generated by three sensors, a vibration sensor, V, and two magnetic, sensors, M1, M2. Three functions exist, $f1=f1(sig\_v, t1\_1, \ldots, t\_vk)$ and $fs=fs(sig\_ms, ts\_1, \ldots, ts\_1)$, and s=2 or s=3. f1 corresponds to a function fj that models the vibration signature for a sensor Vj, as described in 12.2.3. Here, fj models the vibration signatures of sensor V that are associated with movement in the gearbox. fs takes as arguments signals sig_ms, generated by M1 or M2 for s=2 or s=3 respectively, and a set of tuning parameters $ts\_1, \ldots, ts\_k$. The set of function fs includes in its calculation if the signals sig_ms, s=2,3, recorded by M1 and M2, correspond to a rotation of the turbine. Function F=F_WFT then is made up of functions f1, f2 and f3. F calculates a Boolean value for the observable state WFT that signifies that water flow exists and no errors are detected for the gearbox. The determination of the tuning parameters for observable state WFT entails the determination of $t1\_1, \ldots, t1\_k1$, to obtain a model for vibration signature calculated from signals of V that is indicative of activity of the gearbox, and in addition parameters $ts\_1, \ldots, ts\_ks$, s=2,3, to obtain an interpretation of the range of signals generated by the magnetic sensors M1 and M2 that is suited to determine signal patterns associated with flow in the pipe.

The implementation of the software to control a retrofit device includes a set of sensor processors. The calibration of a retrofit device in accordance with a preferred embodiment entails the calibration of all sensor processors. The retrofit device is in operating state calibration, if one or more sensor processors are in state calibration.

For a sensor processor, the initial values for tuning parameters for an observable state may be preconfiguring on a device during software install or set during manual initial configuration. They may then be further adjusted by means of calibration, which also may be performed periodically during operation of the device.

The initial values for tuning parameters for an observable state may be given as a set of configuration parameters, that take into account information about the environment where a retrofit device is installed. For instance, for a sensor processor for vibration sensors 64 attached to a pipe, (64) in FIG. 2, initial values for tuning parameters may be given taking into account the pipe material and geometry, meter type, and soil condition. Initial values for tuning parameters for an observable state may be a best guess, or provided by a configuration that has been cloned from another retrofit device, installed on a flow meter in vicinity of the present one, or from the retrofit device of another meter, situated in an environment that is assumed to produce a similar vibration signature in response to flow of the medium.

During the operation of a retrofit device in accordance with a preferred embodiment, the tuning parameters for an observable state are corrected in response to feedback on their validity. For present example of one or more vibration sensors (64) to detect flow, a learning algorithm may work as follows:

Upon detection of vibration by sensor (64) (e.g. FIG. 2), its sensor processor, P_V, records the signals generated by (64) and invokes a function F=F_WF_V as described herein, to determine if the recorded signals are indicative of flow in the pipe. F_WF_V takes as input the set of signals, $sig\_1, \ldots, sig\_n$, and for each sig_j current tuning parameters $tj\_1, \ldots, tj\_k$ for an observable state associated with F_WF_V, here the event of flow in the pipe. Concurrently, the sensor processor associated with sensors (61), called P_M, samples signals generated by the magnetic sensors and determines if the signals recorded by magnetic sensors are indicative of a rotation of the magnetic coupling. It is assumed that the sensor processor for sensors (61) has already been calibrated. If sensor processors P_V and P_M, each doing its calculation using as input signals from its associated sensors and tuning parameters for the observable state, flow of the medium in the pipe, come to the same result, that either flow in the pipe exists, or not, the learning algorithm will terminate, as the calculation by P_V, with input signals and current tuning parameters for an observable state correctly determined the state. If the calculations by P_V and P_M do not coincide, sensor processor P_V will adjust $tj\_1, \ldots, tj\_k$ in a way described in 12.2.3, such that a determination by P_V using these modified tuning parameters in its model yields the same result like the calculation done by P_M.

In response to the detection of activity by a vibration sensor or by the magnetic sensors are repeated until corrections to the sets of tuning parameters $tj\_1, \ldots, tj\_kj$ of function F_WF_V as described in 13.1 no longer are required. The system may keep a history log of past observed vibration signatures and modifications to tuning parameters. If the described method of adjustment of tuning parameters does not eventually lead a set of parameters that correctly indicate water flow, the history log is analyzed, in an attempt to establish a pattern of recorded frequencies according to the time of day. If such pattern can be determined, the tuning function F_WF_V is modified to include another variable, the time of day. Self-modification of a function may be a too computationally costly task to be performed by a sensor processor on the retrofit device. The retrofit device may request from the management infrastructure to be sent a modified function F_WF_V, that takes the time of day as an additional parameter. Alternatively, the set of tuning parameters may include an anchor for a list of time intervals. The learning algorithm is assumed to eventually lead a set of tuning parameters tj_1, . . . , tj_kj that is stable, i.e. no longer require further corrections. In rare situations, the learning algorithm may not arrive at such set of tuning parameters that does not require further corrections. In these cases, an operator would be required to configure the tuning parameters.

One or more sensors and associated sensor processor may act as watchdog to monitor for flow in the pipe. For instance, in FIG. 2, the magnetic sensors (61), or vibration sensors belonging to set (62) or (64), upon detection of flow may initiate actions, to record the value for throughput displayed by (56) or obtained from (58). A signal to the sensor processor of cameras (59) or (60) will be sent, that will, if energy resources of the device permit, instruct the cameras to periodically generate images or videos of elements (56) or (57) of the meter display, (55), and convert them to a digital representation of values shown on them. Concurrently, the sensor processor associated with magnetic sensors (61) may record the rotation of the magnetic coupling. For a given meter type, the expected rotation count per volume unit is known, since it has been determined earlier during calibration. Thus, the rotation count can be used as supplemental measurement, to obtain greater granularity for measurements of the cumulative throughput, or to confirm the accuracy of the values shown by elements on the meter display.

A retrofit device in accordance with a preferred embodiment may initiate a process for error diagnostics if for an observable event signals by a set of sensors are outside the expected range that had been established during calibration of the associated sensor processor. An example is that the flow volume during a time interval, as determined by the difference of two cumulative throughput values obtained from the digit display (56) does not correspond to the flow volume determined by counting turbine rotations by means of the magnetic sensors (61). The retrofit device may initiate a process for error diagnostics upon an instruction originating from an administration infrastructure. Error diagnosis may entail the following steps:

Establishment of the correct functioning of the magnetic coupling, i.e. verifying the signals recorded by the magnetic sensors (61) are in the expected range that had been established during calibration of its associated sensor processor. A failure of this test may indicate a deformed or misaligned magnetic coupling, or an attempt to tamper, by slowing the turbine with a magnet.

Determination if signals recorded by sensor (62) are within the range that is deemed to be normal. A failure of this test may indicate damage to the gearbox.

During a sampling period, compare the rotation count for the turbine, as determined by means of signals from magnetic sensors (61), with the accumulated water usage determined from the digit display (56), as described in 10.6. A failure of this test may indicate damage to the gearbox or magnetic coupling.

"System and Method for Data Management Structure Using Auditable Delta Records in a Distributed Environment," application Ser. No. 15/367,873, filed Dec. 2, 2016 (incorporated by reference) describes a method to generate audit data that is based on audit blockchains. An audit blockchain is a sequence of records linked by a cryptographic hash calculation. A given record in its metadata contains a cryptographic hash value that is calculated taking as input one or more predecessor records in the chain. Audit blockchains are a mean to establish device identity for a small device, with limited computational resources, such as the situation in an insecure location. An example of such device is an IoT devices that is installed outdoors. Device identity entails for a given device, dev_1, that it cannot be spoofed by another device, dev_2. I.e. it is not possible that dev_2 assumes the identity of dev_1 and for instance communicates with another entity, such as a management infrastructure, without the latter noticing that it no longer communicates with dev_1. In addition to device identity, for devices that are installed in insecure locations, proof of device location frequently is required. Under proof of location for a device it is understood that the location of the device at a given datum can be established in a manner that satisfies regulatory criteria. For instance, for a retrofit device installed on a legacy flow meter at a residential end point of a water supply system, to ensure authenticity of measurement data sent from the device, it is also required to prove that the device is mounted on a given water meter, and that it hasn't been moved to another meter, in an attempt to tamper. Proof of location also is important for instance in industrial installations, for post incident forensic investigations.

Using audit blockchains in conjunction with elements of active and passive security designs provides a comprehensive security implementation for IoT devices that satisfies typical regulatory standards for the generation of data used for audit or forensics.

Active security for a component of an electronic device entails encasing that component in a sealed enclosure, and tamper or opening of the enclosure can be detected. Frequently, the enclosure of such device is monitored electronically for tamper, for instance by means of a sensor that is installed in the interior of the casing. If the casing has been detected as opened, various actions may be performed, such as generating an event or notifying a remote infrastructure that controls the device, or initiating erasure of or part or all data that are stored in volatile or non-volatile memory or storage, that is contained in the device. If memory and storage is erased, the device would be rendered unusable after the tamper seal has been broken, and any data stored on the device would be lost. For an IoT device that communicates with a management infrastructure, the use of audit blockchains in conjunction with active security is a mean to establish device identity for the IoT device with a management infrastructure, that satisfies audit requirements. The IoT device, dev_1, sends data to the management infrastructure in blockchain format. A device, dev_2, that attempts to assume the identity of dev_1 and send data to the management structure in place of dev_1, would be required to generate blockchain records that preserve the continuity of the blockchain, i.e. contain the hash value of one of more predecessor records. These records are stored in dev_1, in memory or storage, and, if active security is enabled, during a tamper attempt are not accessible to be copied to dev_2, since it would be ensured that on dev_1 memory or storage containing these predecessor records would be erased upon breaking the tamper seal of the device. Thus, active security in conjunction with block chains yields a method to prove device identity.

A way to establish location for a sensor device by means of active security is to attach a retrofit device to a fixed, immovable structure, by means of an electronic locking device. An electronic locking device provides for secure, physical attachment of a device to another object, and electronic monitoring of the mean of attachment. For instance, a cable lock with electronic monitoring is an example of an electronic locking device. It consists of a cable that is connected to an electronic component, which monitors if the cable has been severed, and if so, will send a notification, using a mean of network transmission. The electronic component, that monitors the state of the cable may be enclosed in a tamper proof enclosure and transmit signals periodically, advertising its state and the state of the cable. It may do so, for instance, using a ZigBee or BLE network connection or RF signaling.

Establishing location for a retrofit device by means of active security, using an electronic locking device, is not always practical; it may be complex to don in on-site installations, and error prone.

Figure 4:
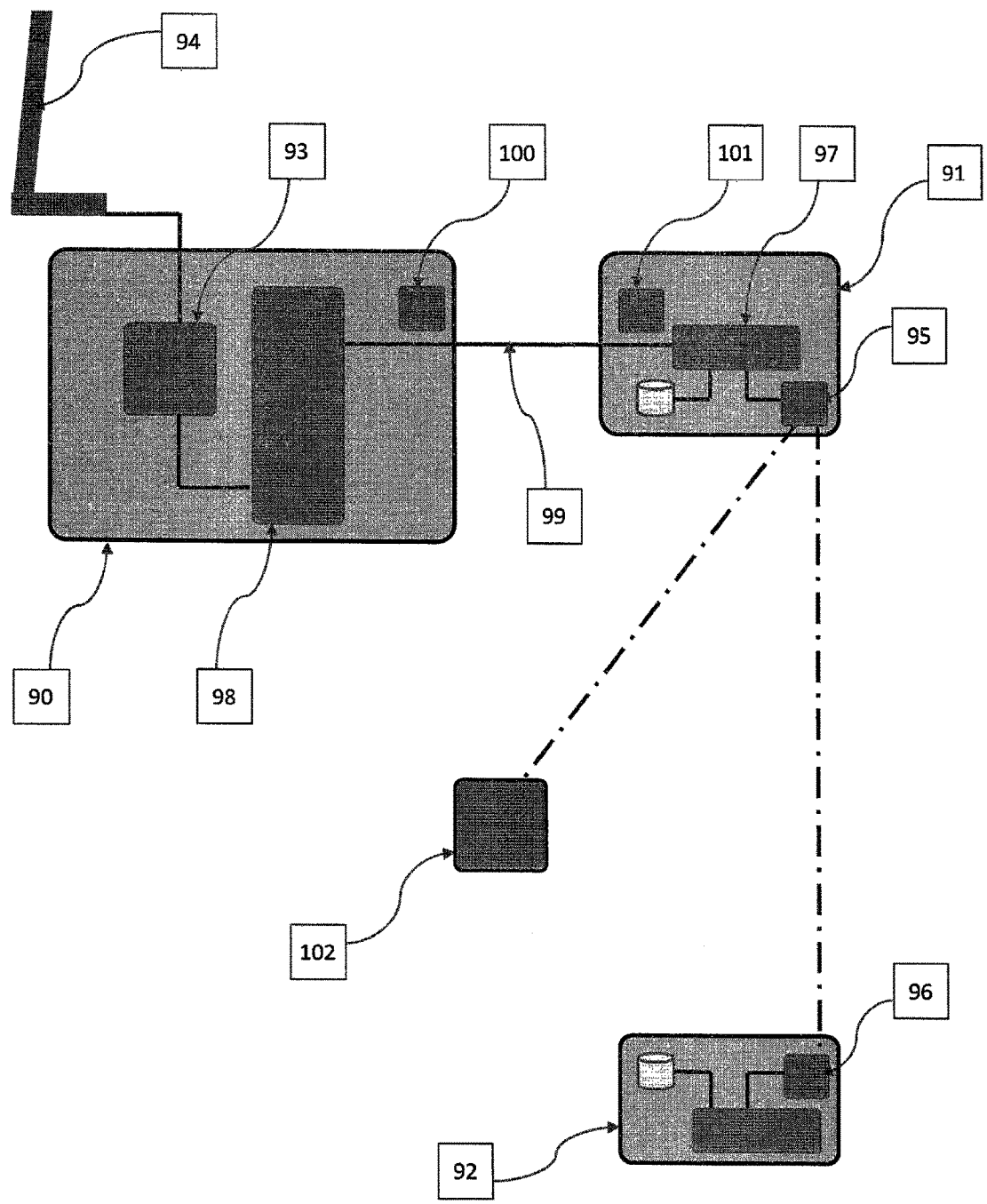
FIG. 4 is a block diagram of an embodiment of a retrofit device.

Passive security for a device or component of it entails establishing for that device a link by means of a digital signature, with an entity, whose security has been established in another way. In FIG. 4, a retrofit device is shown that consists of two modules, (90) and (91). Both have active security enabled, i.e. have a tamper seal. Module (90) contains a controller for communication, (93), that is connected to an antenna, (94). Module (91) has a component, (95), to communicate with a device, (92), that is assumed to be trusted, and at a known location. Component (95) communicates with (92) by means of component (96), and (96) is capable of sending a signal containing a signature to component (95) that is suited to identify the location of (95) and thus also module (91). The location of (95) may be for instance given as distance of (95) to (91), or in a format that allows for an accurate identification of (95) in a 3D space. For instance, (95) may be an RF antenna and (96) is an RF antenna. (95) receives from (96) a message containing a digital signature from device (92) combined with a notification of the distance between (96) and (95). Also, (92) may be made up of multiple components, not shown here, each having an RF antenna (96). The antennas (96) have a spatial placement that, when communicating with component (95) allows for the determination of the location of (95). Component (95) receives from (96) a message containing a digital signature issued by device (92) combined with a notification of the location of (95). The message amounts to a proof of location for (95) and thus device (91). (92) also may be an electronic locking device that has been attached to an immovable structure, such as a pipe or a flow meter, during a supervised installation. Such electronic locking device does not necessarily need to secure a retrofit device; it just needs to be capable of the functions of device (92) with regards to communication with module (91).

The method of establishing location identity that has been illustrated using FIG. 4, by means of communication with a device for which location identity has been established, device (92) in FIG. 4, is applicable beyond retrofit devices; it is a mean to establish location identity for an IoT device in general. Also, the components contained in modules (90) and (91) may all be contained in the same module for that method of establishing location identity to be applicable.

This establishes for module (91) a geographic location, signed by trusted entity (92). A controller, (97), on module (91) communicates with controller (98) on module (90), by means of a network connection, (99). Connection (99) may be any network connection between modules of a device as described for FIG. 1. The communication between (97) and (98) is trusted by means of cryptographic keys. Thus, a chain of trust has been established to communicate the location of the device to the management infrastructure. (91) receives its geographic location from (92), a trusted device, and passes it on to module (90), by means of a trusted connection. (90) sends the location to a management infrastructure, as payload of a block chain record, generated by (93) and sent across a network connection, (94). Prof of identity for modules (90) and (91) is given by active security. This establishes a tamper proof mean for the device containing modules (90) and (91) to establish its geographic location with a management infrastructure. Instead of determination of the location of (95) and thus (91) by RF antennas, passive security for (91) may be established in other ways, involving a mean of signaling between (91) and (92), and (92) being situated in a trusted location.

In addition, module (92) may send messages to module (91) in blockchain format, which are then encapsulated into the payload of the blockchain generated by (93). This allows to include (92) into a system for auditing for an installation of IoT devices.

Component (95) may be a vibration sensors and (96) a component capable of emitting acoustic signals. For instance, for a flow meter, (95) may be attached to a pipe near the flow meter, and (96) attached to the same pipe segment to which the flow meter belongs, in proximity to component (95), and with no other flow meter nearby at an install location where the signal emitted by (92) can be detected. Device (92) is situated in a secure location, for instance a building. (96) emits an acoustic signal with a unique signature, identifying the location of (92), that is received by component (95) and further transmitted to the management infrastructure, by means of network connection (99), and using cryptographic keys. Another possibility for signal transmission from a trusted source is that (95) is a GPS receiver.

Alternatively, module (91) may not communicate with an electronic device, but (95) may be a sensor or transmitter that probes for signals that are generated by a passive source, i.e. sources that do not require electric power to generate a signal. For instance, (102) may be an RFID chip that is permanently mounted to the pipe infrastructure, in vicinity of the flow meter, in a tamper proof manner, and (95) is an RFID reader. (102) encodes a unique location ID, and (95) periodically sends out signals to query (102).

Location identity also may be established by detection of movement. A device may be installed in a supervised manner, during which its location is verified and recorded. For a retrofit device for a flow meter that has a magnetic coupling, (95) may be the set of magnetic sensors corresponding to (61) in FIG. 2. The sensor processor associated with (95) periodically evaluates the signals generated by sensors (95) to verify the presence of the magnetic field generated by the magnetic coupling, and created a notification containing the result of that test, to be forwarded to the management infrastructure. Thus, the management infrastructure receives periodically a notification whether or not the retrofit device has been moved. Alternatively, (95) may be an acceleration sensors that detects movements of the retrofit device, indicative of tampering. Both methods of detecting relocation of the device require that module (91) has a power source suited to support the periodic activation of (95) and its associated sensor processor without interruption, and independent of module (90). Further, (91) would need to have the computational resources to store results of the test of sensor signals, if for a period of time results cannot be sent to the management infrastructure.

A device may record signals by various sensors and generate a signal profile that is deemed to uniquely identify the site of installation, or a distance from a known location. For instance, component (95) may be one or more sensors that sample environmental signals, such as vibration, magnetic field, or RF signals, to generate a unique signal profile of the environment. The sensor processor associated with component (95) then evaluates signals captured by (95) periodically, to compare them against the captured signal profile, and sends notifications to the management infrastructure.

A retrofit device for a legacy flow meter may be able to establish device identity by taking photographic images of the meter display, (55) in FIG. 2, or querying digital interface (58). Often a meter display contains a serial number, and a photographic image of it may be converted to a numeric representation by means of image recognition. (58) might provide a unique identifier of the flow meter upon query.

A retrofit device may implement one or more of the described security methods, active security, determination of location or audit blockchains independently of others.

The retrofit device is enabled to participate in an automated management system for IoT devices. Such automated management system for administration of IoT devices may be used to instruct the IoT devices to perform actions, or store and process data sent by them. For instance, an automated management system to administer retrofit devices for flow meters in a pipe installation may provide for the storage of a history of measurements of cumulative or current rates of throughput, forwarded by the retrofit devices, and further functions for accounting and analysis of the data, for instance to find defects in the pipe system.

Figure 5:
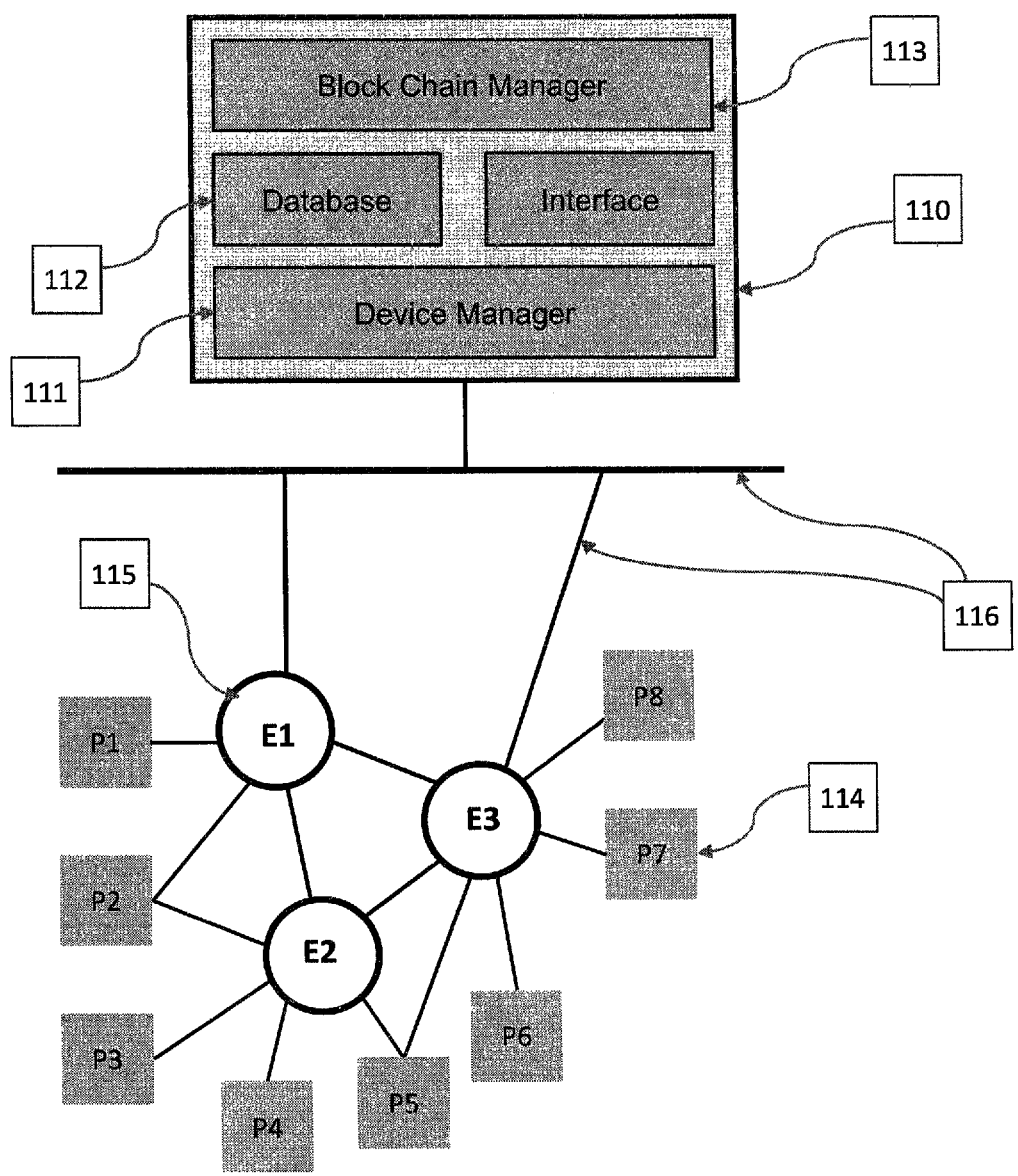
FIG. 5 is a functional diagram of a network of IoT devices connected through a network to a management infrastructure.

FIG. 5. shows an example of a management infrastructure, (110), for a set of IoT devices, P1, . . . , P8, (114) depicts P7. The IoT devices are connected to network devices (115), in FIG. 5, E1, . . . , E3. The set of network devices may contain gateways, routers or edge devices, which are connected to the management infrastructure by means of a network connection, (116). The management infrastructure may be made up of one or more servers, that may also be virtual servers in a cloud. The management infrastructure implements several functions, such as a device manager, (111), a database (112), and an administration interface, (113). If the IoT devices (114) implements audit blockchains, (110) also includes a blockchain manager, (117), which stores data in blockchain format, generated by the IoT devices. The device manager (111) provides for administration of the IoT devices (114). For instance, if an IoT device is a retrofit device for a flow meter, the device manager may issue a request to the retrofit device to send a history of recent measurement of throughput values, or statistics about device health. The IoT devices as well may implement a protocol for peer-to-peer communication, to communicate directly with each other, without participation of the management infrastructure. For instance, P2 and P3 may communicate with each other to coordinate the recording of signals generated by sensors.

The software and firmware of a retrofit device implements functions for communication with a management infrastructure (110), and also may contain function for peer-to-peer communication. The retrofit device is capable of receiving instructions for the collection of signals generated by its sensors, performed at a scheduled time interval, and send the results to other devices or a management infrastructure. In addition, the retrofit device may perform analysis of recorded signals before sending them. If a retrofit device is not connected to the electric grid, it must be capable of performing such autonomous actions under the constraints of limited battery power, and also, the implementation of the device manager, (111), needs to account for the possibility that such device may have insufficient energy resources. For instance, for a device of the set P1, . . . , P8 (114) upon request by the device manager or a peer device to collect signals of its sensors, its response may include a value for the probability that it will have sufficient electrical energy reserves to perform the data collection at during the specified time interval.

In a legacy pipe system, without a mean to simultaneously determine the current rate of throughput at many probe points, many defects are difficult to analyze. Examples are flow in a pipe caused by leaks or backpressure in a pipe. Both events may only occur if the intra-pipe pressure is above a threshold or within a certain range. Often, the operator of a pipe infrastructure is aware that pipe leaks exist, yet localizing them is difficult and labor intense, and therefore often not attempted. Currently, leak detection in pipes frequently is performed by means of acoustic signal detection, attaching devices that record acoustic signals at probe points in the pipe system.

The presented retrofit device for a flow meter supports water leak detection using large scale data analysis, since it allows for integration into an automated management system that schedules measurements of rates of flow at many probe points simultaneously. Several tasks in analyzing flow in a pipe infrastructure depend on the ability to effectively determine the rate flow in real time, concurrently at many probe points. Moreover, a device that probes the rate of flow at a probe point, must be capable of detecting small rates of flow, since the rate of flow in a pipe that is caused by a leak may be miniscule. By measuring the rotation speed of the magnetic coupling, the retrofit device is capable of determining the present rates of flow during a minimal sampling interval, with maximum possible precision, limited by the design of the component of the meter that is immersed into the pipe, such are the turbine. Its capability to measure the rate of flow during a minimal sampling interval, and thus with a small energy footprint, makes it practical for the retrofit device, that has a limited power supply, to be integrated into an automated system for analysis of a pipe infrastructure.

Figure 6:
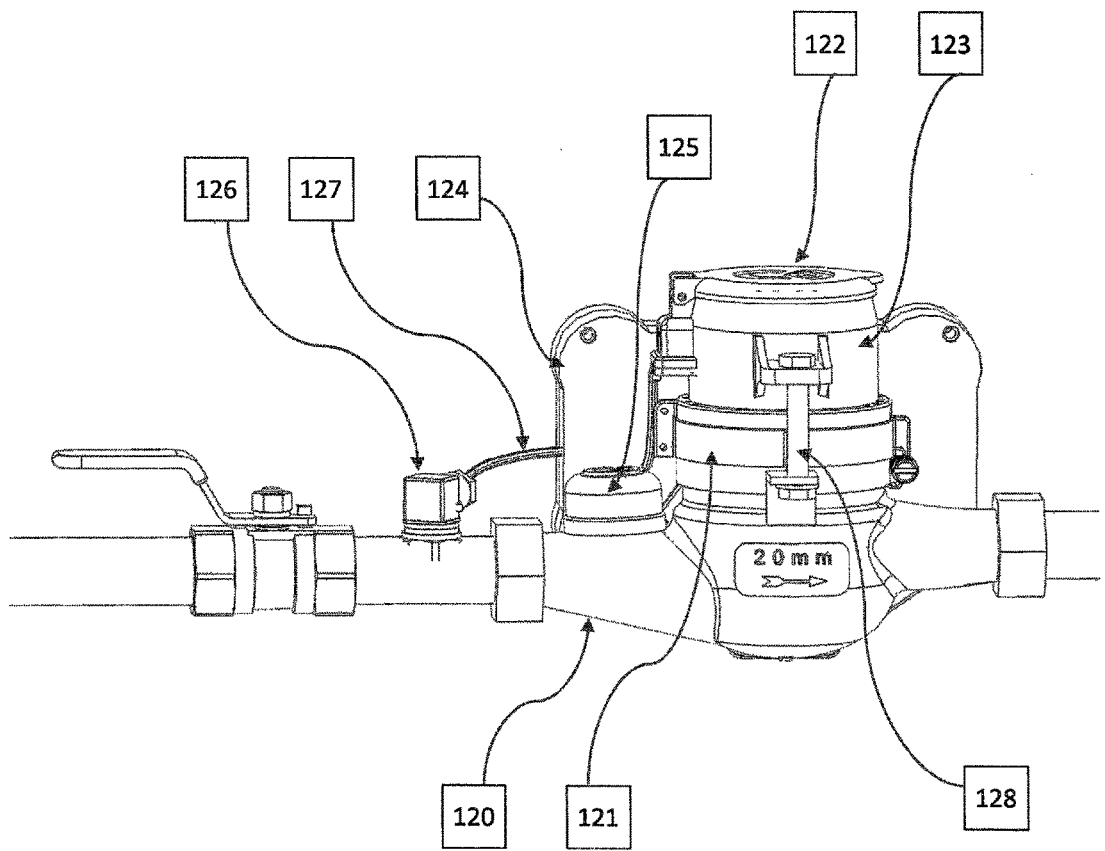
FIG. 6 is a side elevation view of an embodiment of a retrofit device coupled to a legacy flow meter.

FIG. 6, shows a retrofit device (119) installed on a water meter. (120) shows the exterior casing of the water meter installed in a pipe. The retrofit device is made up of parts (121), . . . , (128). The casing of the retrofit sensor device consists of four modules. A module is as had been defined for FIG. 1 component of a device with a physical enclosure. One module is the camera module and another is the main module, (124). The casing of the camera module (129) is made up of parts (121), (122), and (123). In addition, two auxiliary modules exist, (125) and (126), that are affixed to the pipe envelope. (125) is attached to the meter casing and contains a vibration sensor. (126) is attached to the pipe and contains a pressure sensor. The camera module contains one or more cameras, one or more light sources, and a controller for the light sources and cameras. The controller casing, (124), contains the controller that provides all services except camera control, such as hosting the embedded operating system, network communication, and battery charge control. (124) also may contain rechargeable batteries, or they may be in a separate unit, not shown here. The electrical components that reside in the camera housing (129) are connected to electrical components in (125) by means of a cable, not shown in FIG. 6. The electronic components of auxiliary module (125) are connected to the ones in the camera housing by means of a cable, now shown in FIG. 6, and the electronic components of (127) are connected to the ones in (124) by means of cable (127). Further cables connect to (124), not shown from this perspective, that connect to a solar panel, and rechargeable batteries, not shown here. (121) is an adapter ring that is mounted onto the water meter display and (123), the main part of the camera housing (129) is attached to (121) by means of screws. One screw is shown here, (128). (122) is a lid for the camera housing (129), covering a transparent display, which allows for the manual inspection of the meter display.

Figure 7:
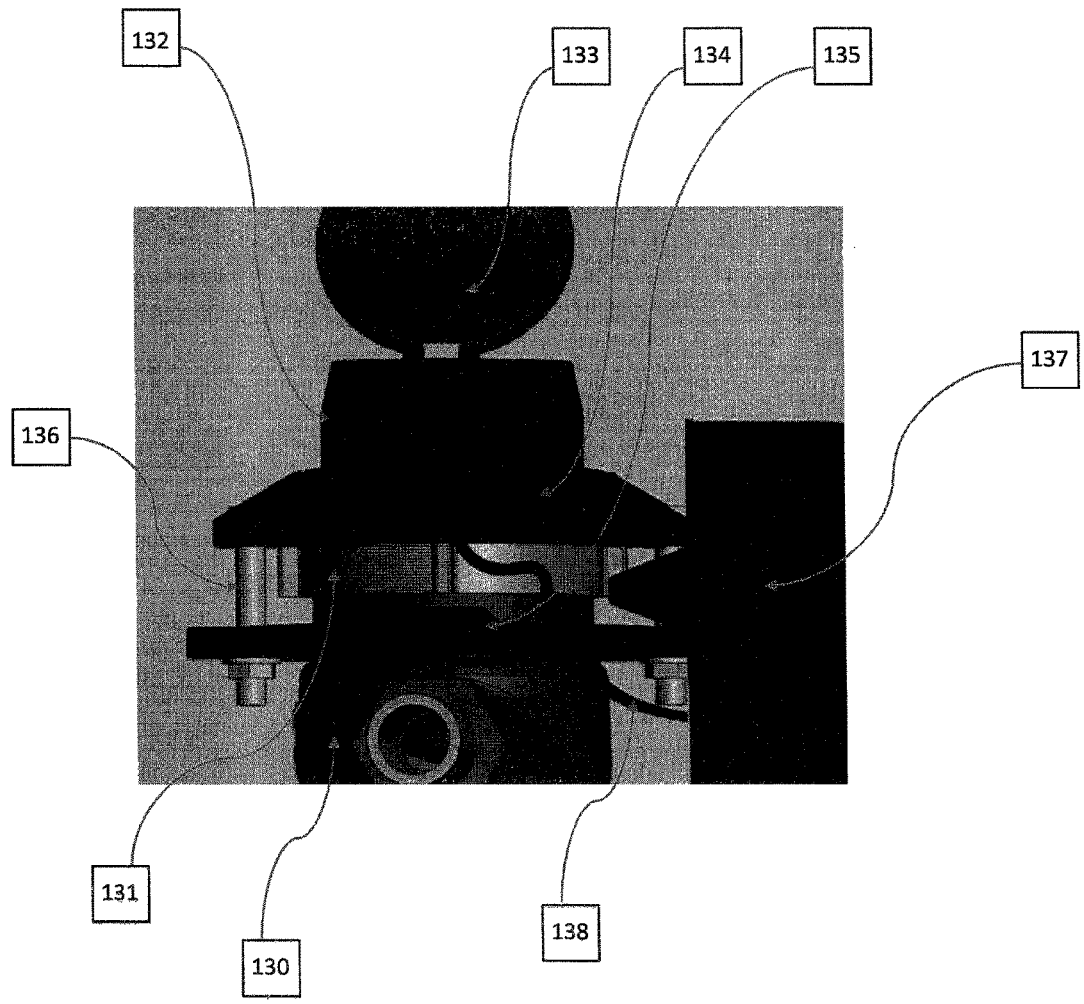
FIG. 7 is another side elevation view of an embodiment of a retrofit device coupled to a legacy flow meter.

FIG. 7 shows a schematic drawing for the design of a casing and mounting base for a main module of a retrofit device (119) that is similar that is similar to the one in FIG. 6. The casing of the camera module is made up of parts (132), . . . , (136). (132) is the main component of the casing of the camera module. The exterior frame of the meter display is shown, (131), and (132) is attached to the meter display by means of (134), which is an adapter ring. (134) is attached to the top of the meter by means of the meter clamp, (135), which is attached to the casing of the water meter, (130). (134) and (135) are connected by screws or bolts, one of which is (136). (133) is the lid of the camera module. (137) is the main module, connected to the camera module by cable (138).

Figure 8A:
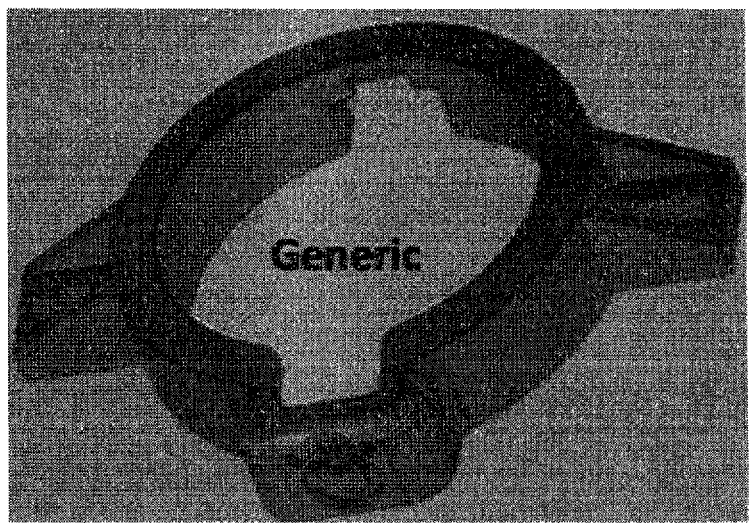
FIG. 8*a* is a perspective view of an adapter ring for connecting a retrofit device to a legacy flow meter.
Figure 8B:
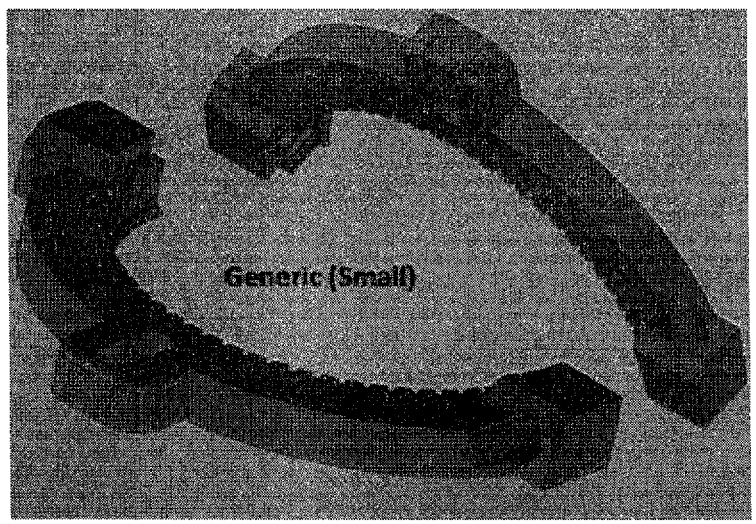
FIG. 8*b* is a perspective view of a two part adapter ring for connecting a retrofit device to a legacy flow meter.

FIG. 8a. shows the adapter ring (134) of FIG. 7 and FIG. 8b. shows meter clamp (135). These two components comprise an adapter, whose purpose, aside from affixing casing part (132) of the camera module to the meter display, is to account for the various types of flow meters used in pipe installations, that typically differ in size and form factor. This allows for an economical manufacturing of the casing of the retrofit device, with one form factor for the casing of the camera module fitting a variety of flow meter types, and differences in their size and form factor being accounted for by manufacturing the adapter components (134) and (135) specific to the form factor and size of a water meter.

The meter clamp, (135) in FIG. 7. may be made of two components, as shown in FIG. 8b, which allows for tolerating small variations in the circumference of the part of the flow meter to which it is attached. FIG. 9a. and FIG. 9b. illustrate the attachment of the meter clamp (135) to a flow meter. FIG. 9a. shows the process of attaching the two components (142) of the meter clamp (135) around the meter display, (141), of a water meter, (140), by means of screws, (143). FIG. 9b. shows the attached meter clamp, (144), after fasting the screw connection, (143) in FIG. 9a.

Figure 10:
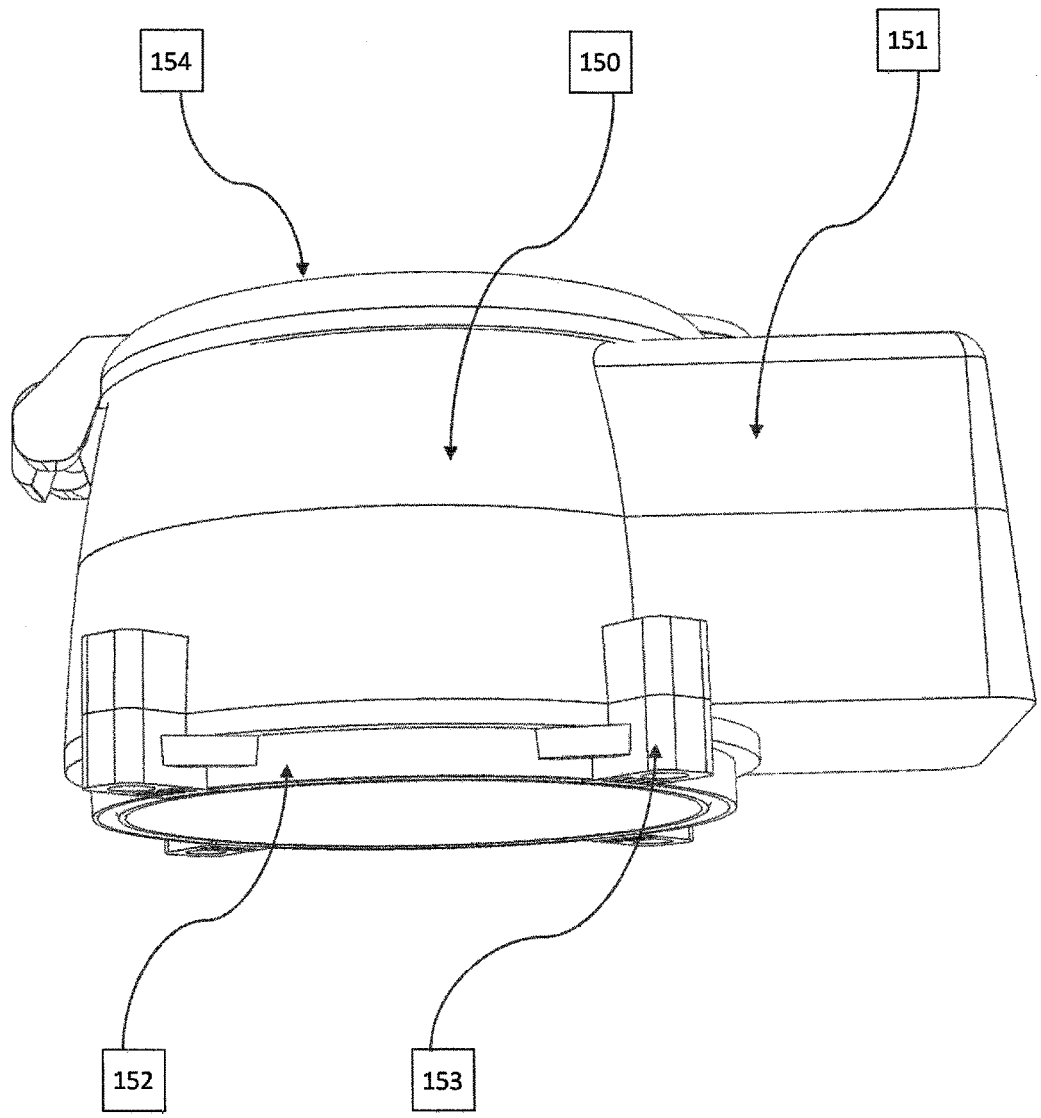
FIG. 10 is a perspective view of a retrofit device emphasizing the camera module.

FIG. 10 shows another example of a design for a camera module (150). The main component of the casing contains an attachment, (151), that contains the electronic components of the controller for the cameras and further sensors; a controller being a functional unit as introduced for FIG. 1. (154) is the lid, protecting a transparent cover, not shown in FIG. 10. (152) is an adapter ring to attach the main component, (150), by means of screws situated in (153).

Figure 11:
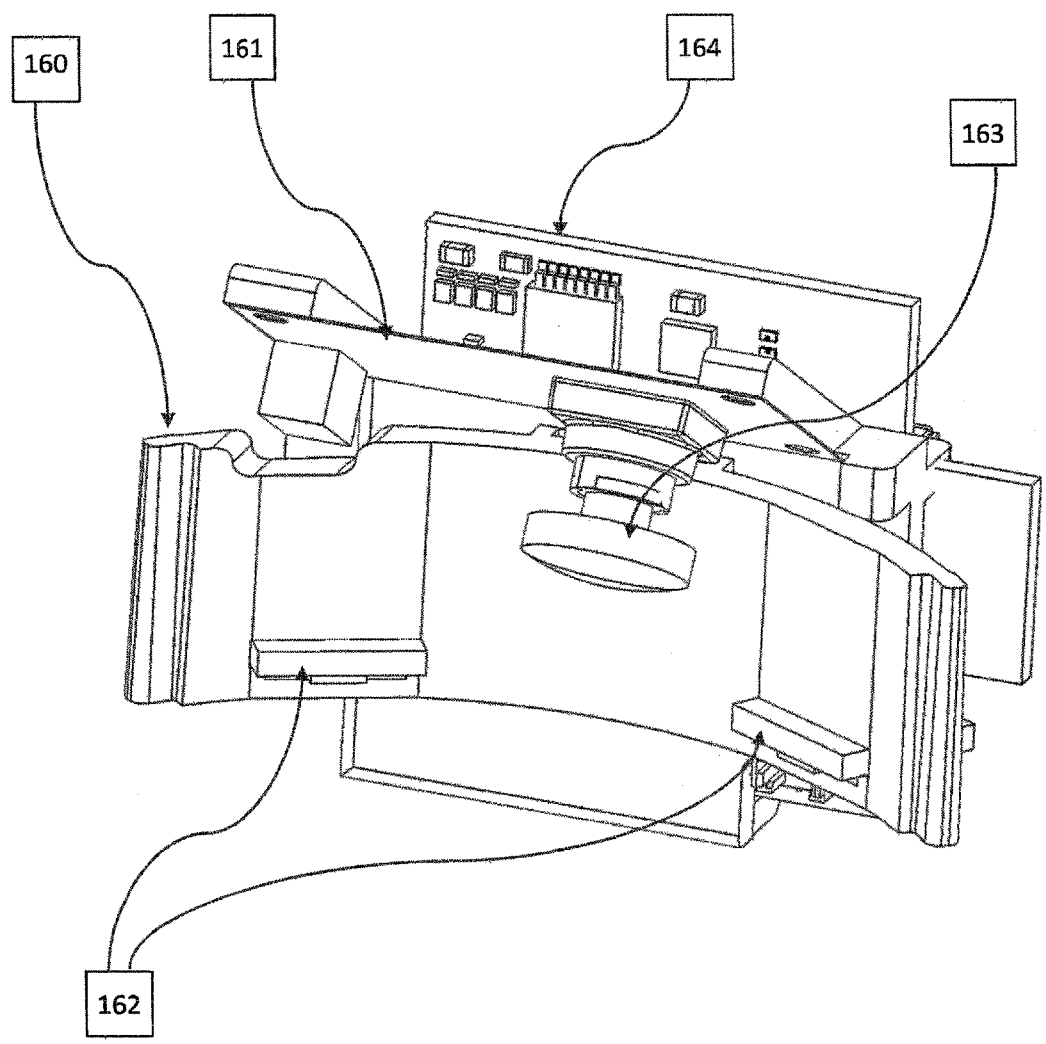
FIG. 11 is a perspective view of portions of the camera module of FIG. 10.

FIG. 11. shows a casing of a camera module (such as 129 in FIG. 6), contained in casing (150) in FIG. 10, that provides an attachment for the camera and magnetic sensors, and the electrical components of their associated sensor processor. The rounded component (160) provides an attachment base for the magnetic sensors, (162). Component (161) is an attachment base for a camera, (163). (164) is a micro-board that contains the majority of electronic components of the sensor processor for (162) and (163). The component shown in FIG. 11 is mounted inside the casing of the camera module, (150) in FIG. 10, such that micro-board (164) is contained in casing component (141), and the magnetic sensors (162) are close to the meter display.

The transparent cover situated on top of the casing of the camera module (150) is protected by a lid, (154) in FIG. 10. This is to protect that transparent cover, but equally important, to eliminate variations in light exposure for the meter display. For instance, glare caused by direct sunlight would affect the quality of photographic images of the meter display, taken by the camera, and the image recognition software may not be able to determine a numeric value of the meter display from such image. Lighting for the camera is controlled by eliminating daylight in the casing of the camera module and using a light source. To eliminate glare and reflection, such light source needs to be situated close to the surface of the transparent cover of the display of the flow meter.

Figure 12:
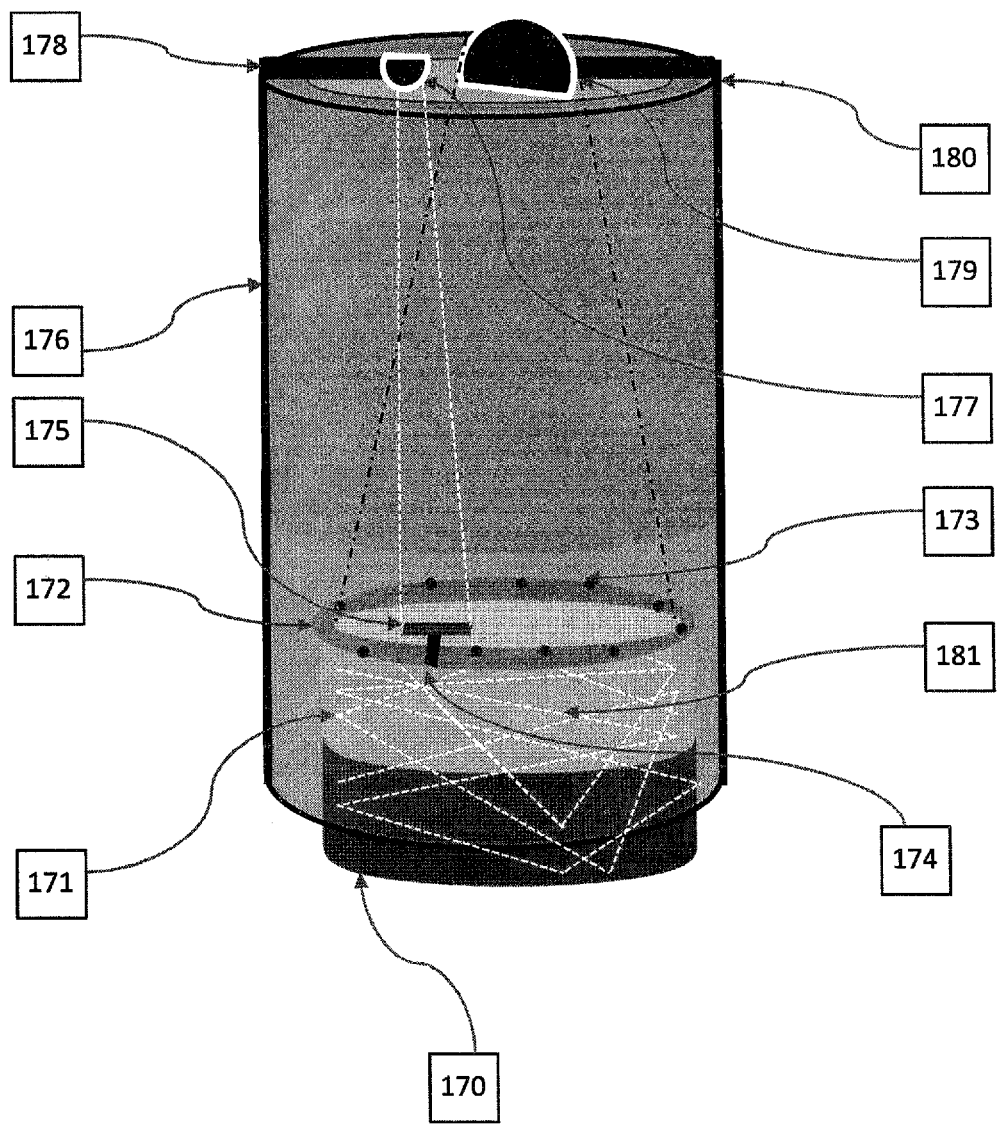
FIG. 12 is a schematic illustrating illumination of the meter display of a flow meter.

The schematic drawing of FIG. 12. shows a method of illumination of the meter display of a flow meter. (170) depicts the meter display and corresponds for instance to (131) in FIG. 7. (176) depicts the main part of the casing of the camera module. The lower part of (176) is depicted in a semi-transparent way, to show the spatial arrangement of parts situated in its interior. (176) corresponds for instance to (150) in FIG. 10 or (132) in FIG. 7. Other parts of the camera module casing, such as the lid, (133) in FIG. 7, are not shown. (177) depicts a light source and (178) a mean to affix the light source to casing part (176). (179) depicts a camera and (180) a means to affix the camera to (176). For instance, in FIG. 11, part (161) performs the function of (178) and (180), and (163) corresponds to (179) in FIG. 12. A transparent element with light refractive properties, (171), is placed in close proximity of the surface of the meter display, (170), or in direct contact. (171) if made of light refractive material, for instance, glass, acrylic glass, or transparent resin. The function of (171) is to act as light diffuser, to provide even and diffuse illumination of ambient parts, in particular the meter display. A set of lighting elements is placed on the perimeter of (171), one of which is (173). Such lighting elements may for instance be LEDs. The lighting elements are electrically connected and (172) shows a frame that may be used to achieve a spatial arrangement of them at the perimeter of (171). FIG. 12. shows the lighting elements placed on top of transparent element (171). Other arrangements are possible, shown in FIG. 13. The material properties of (171) achieve a refraction of light rays that enter (171). The spatial placement of lighting elements close to the surface of (171) together with the light refractive properties of (171) provides for a reflection of light rays in a diffuse manner, reducing the amount of light that is reflected back towards the camera, reflection that would interfere with capturing a photographic image of the meter display. (181) illustrates the reflection of light rays emitted by lighting elements (174) in (170) and (171).

The lighting elements may be electrically connected to a controller that is situated in the camera module. For instance, the lighting elements may be connected to the micro-board (164) in FIG. 11. and controlled by the sensor processor of the camera, the sensor controller, before instructing the camera to capture a photographic image or video, switches on the lighting elements.

The electrical circuit that interconnects the lighting elements may be electrically isolated from all other electrical components of the retrofit device, and have an autonomous power source. In FIG. 12, the lighting elements are electrically connected to a photovoltaic element, (175), by means of electrical connector (174). Light source (177) shines light onto (175), and the electrical energy generated by (175) in response to stimulation by light causes an activation of the lighting elements. (177) is controlled by the sensor processor of the camera, enabled for the duration of image capture. Multiple light sources (177) and multiple photovoltaic elements (175) may exist.

This manner of remote energy transmission, by means of a light source that activates a photovoltaic element, provides a solution to an important challenge in designing a retrofit device that requires illumination, the insulation of electrical components. To avoid glare and reflection, lighting elements frequently need to be placed close to the object they illuminate. For instance, in case of a flow meter display, they need to be close to the transparent cover of the meter display. This requirement for their placement introduces complexity in the design of the retrofit device, or sources of potential errors during installation of the retrofit device and causes for a premature failure of it. The lighting elements are required to be placed close to the surface of the transparent cover of the meter display, and if they are electrically connected to other electrical components of the retrofit device, either a flexible electrical cable is needed or the electrical connection is provided by an element that is closely integrated into the casing of the camera module. A flexible electrical cable is a source of potential errors during installation of the device, it may be inadvertently damaged. A design that has a close integration of the electrical connection with the casing, and thus also requires a close integration of the lighting elements with the casing, may not be achievable in a modular way. Such design may result in a form factor for the casing of the camera module that is not adaptable to a range of flow meters, thus increasing the cost of retrofitting a pipe system that contains flow meters of a variety of types.

Another concern in the design of a retrofit device that contains an electrical element that is situated close to a component of the legacy device is electrical insulation. For instance, differences in temperature may cause a build-up of condensation moisture, which requires special provisions to be made in the design to achieve insulation, further adding to the cost of the retrofit device and sources of potential errors after installation.

The presented method of energy transmission to the lighting elements shown in FIG. 12 avoids aforementioned drawbacks of a design that requires an electrical connection between the lighting elements for the meter display and other electrical components of the device. During installation of a retrofit device, the attachment of the transparent element (171) near the surface of display element (170) may be achieved in several ways. For instance, it may be permanently affixed with a transparent glue. The dimensioning of (171) may be such that it does not cover the entire surface of (170), and typically it will fit into the interior of casing component (176).

Figure 13:
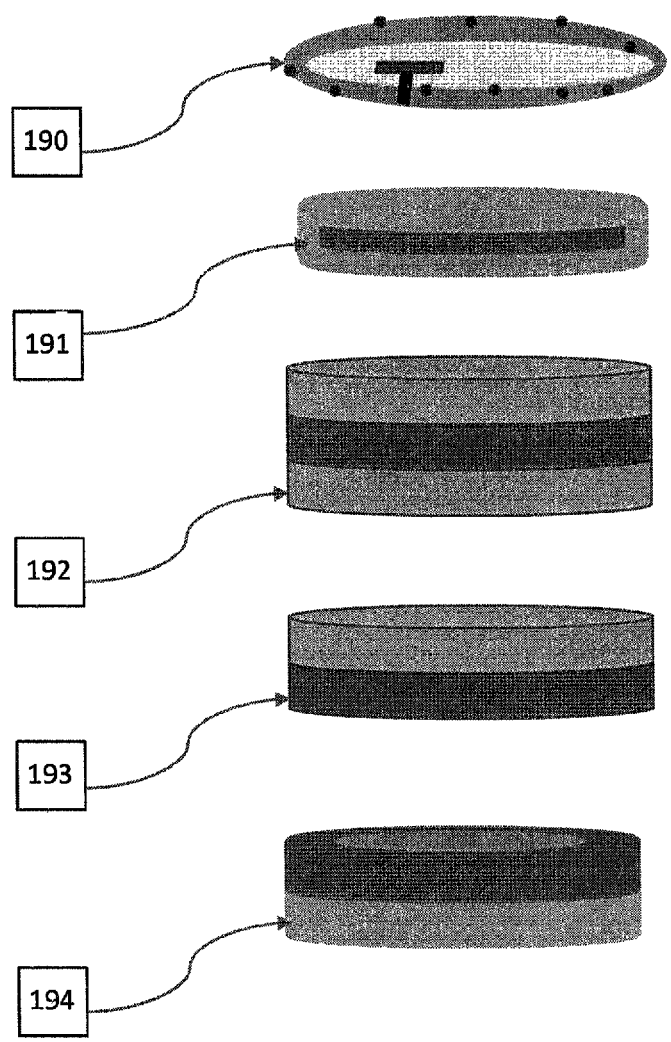
FIG. 13 is an exploded view of the lighting elements of FIG. 12.

FIG. 13 shows possible spatial arrangements of the lighting elements in relation to transparent element (171) of FIG. 12. In FIG. 13, (190) depicts a unit consisting of lighting elements, photovoltaic element (175), and (174), the electrical connection between (175) and the lighting elements. (190) may include a frame, (172) in FIG. 12, that may be used to achieve a spatial arrangement of lighting elements, such as a circle in (190). Unit (190) may be placed in relation to the transparent element, (171) in FIG. 12, in various ways. (190) may be entirely enclosed in the transparent element, shown by (191), and thus the transparent element providing electrical insulation for (190). (192) shows an arrangement where the transparent element is made up of two components and (190) is situated between them. (193) shows a solution where (190) is positioned at the bottom of the transparent element and (194) a solution where it is positioned on the top of it.

Another way to illuminate the meter display that minimizes reflection is by means of an optical waveguide. An optical waveguide consists of one or more bodies made of light refractive material. A light ray, after having entered such body made of light refractive material will be reflected internally, provided the angle formed between light rays and the surface of the body falls within a certain range. For instance, Fiberglass transmits light by means of its refractive properties and sometimes is used to transport light waves across a distance, for purposes of illumination. The efficiency of an optical waveguide for light transmission depends on the refractive properties of the material it is made of and its geometric shape.

Figure 14:
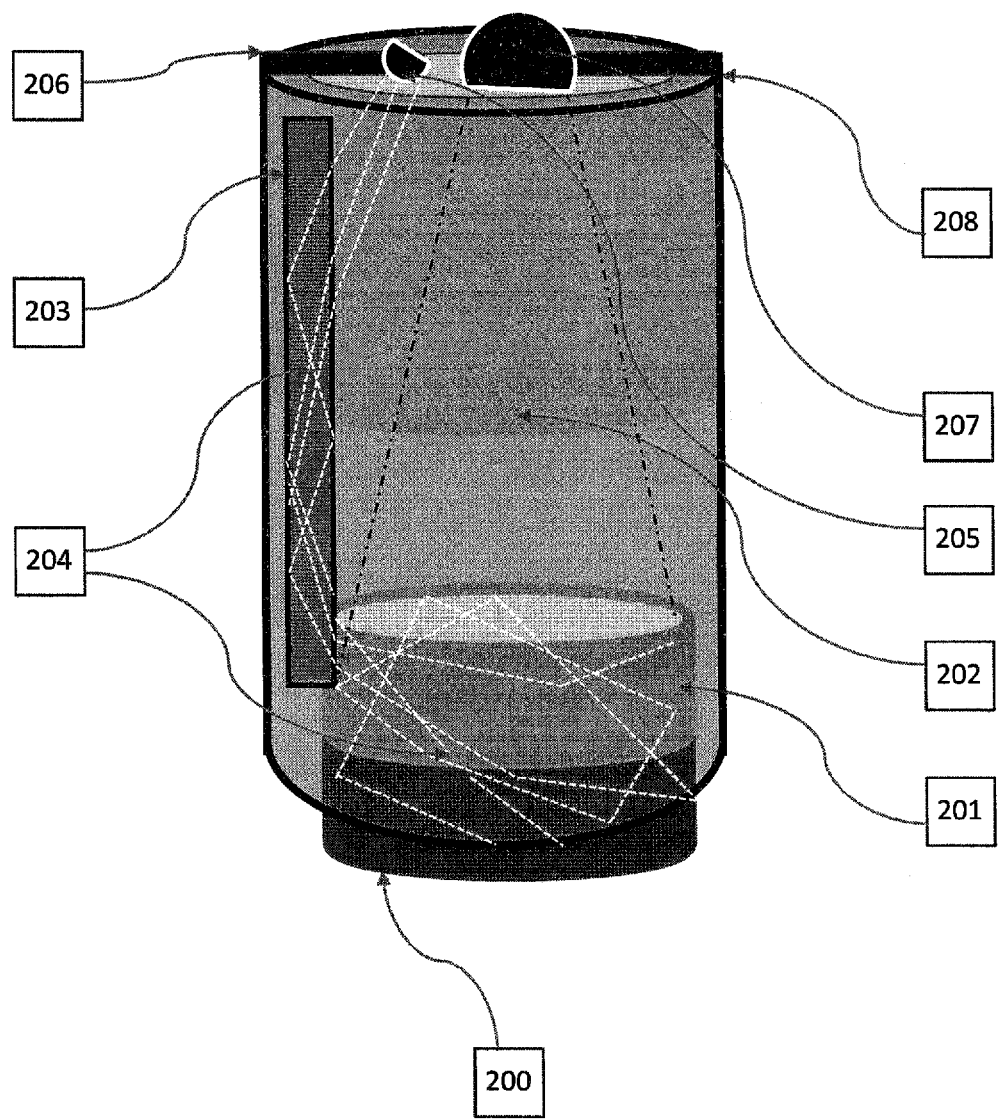
FIG. 14 is a schematic diagram of another form of illumination of the meter display.

FIG. 14 shows a schematic drawing that illustrates the illumination of the meter display, (200), using light transmission by means of a waveguide, (203). (201) depicts a transparent element, like (171) in FIG. 12, having the purpose to refract light rays and provide diffuse illumination of the meter display situated below it. (202) is a part of the casing of the camera module. The lower part of (202) is depicted in a semi-transparent way, to show the spatial arrangement of parts situated in its interior. (205) is a light source and (207) a camera. (205) shines light on waveguide (203), and light rays are reflected inside the waveguide, which has surface contact or is in close proximity with (201). The dotted lines, (204), depict light rays being reflected by the interior surface of the optical waveguide, (203), and their propagation being constrained by the geometry of (203). The light rays enter (201), where they are refracted further and illuminate the meter display, (200). The spatial alignment of (201) and (203) is such that a loss of light waves that are guided along (203) and then enter (201) is kept minimal. A design also may combine (201) and (203) into one solid element.

Figure 15:
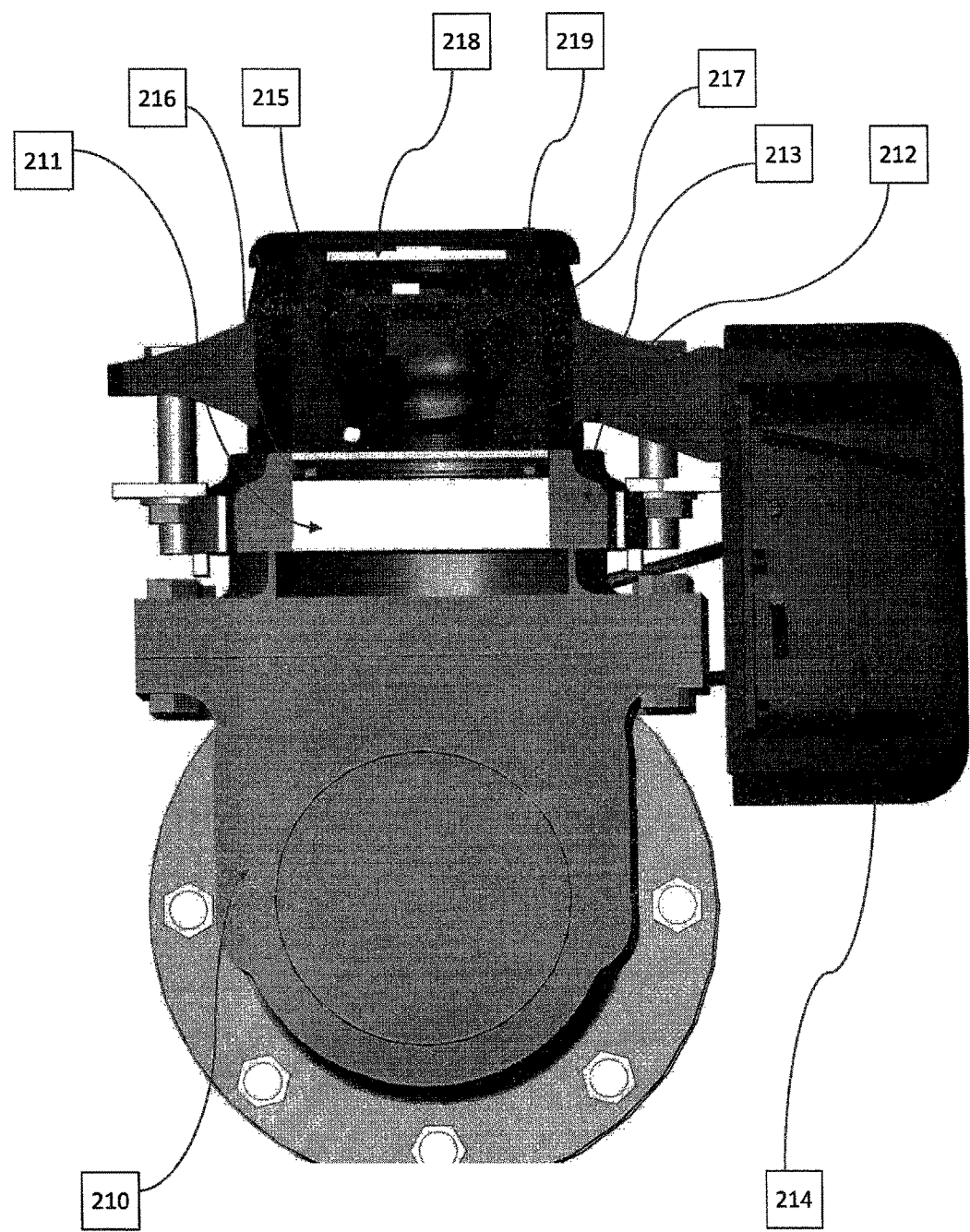
FIG. 15 is a cross section of a legacy flow meter and portions of a retrofit device attached.

FIG. 15 shows the cross section of a legacy flow meter 220 with attached casing of a retrofit device 222 that uses the method for illumination of the meter display shown in FIG. 12. (210) depicts the part of the flow meter 220 that that is connected to the pipe and (211) is the cross section of the meter display. (212) is the adapter for the attachment of the camera housing, similar to (135) in FIG. 7. (213) is the casing of the camera module, and (214) the casing of the main module. (215) is a transparent surface with light refractive properties, corresponding to element (171) in FIG. 12. A ring of lighting elements, (216), is situated between the refractive surface and the meter display, that are connected to a photovoltaic element, not shown in this cross section. (216) is the holder for the camera. (218) is a translucent display for the retrofit device (222), and (219) the lid.

What is claimed:

1. A method of retrofitting an already installed legacy flow meter having a meter display and a magnetic coupling driving said meter display, comprising:
   connecting a retrofit device to said flow meter, said retrofit device having:
      a camera positioned when connected to said flow meter to record the meter display; and
      one or more magnetic sensors positioned proximate to said magnetic coupling;
   powering said retrofit device with an autonomous power source;
   detecting a variation in the strength of the magnetic field of said magnetic coupling;

transmitting the meter display recorded by the camera periodically to a network; and receiving commands from the network to perform a function with the retrofit device.

2. The method of claim 1, said transmitting step based on a time interval, request from the network, or both.

3. The method of claim 1, said receiving step comprising receiving a command to record said meter display.

4. The method of claim 1, the meter display comprising one or more of flow rate, cumulative flow or fluid pressure for said legacy flow meter.

5. The method of claim 1, further comprising:
determining the rotation of the magnetic coupling over a time interval;
computing flow volume over said time interval through the flow meter; and
comparing said computed flow volume with a flow volume derived from the meter display recorded by the camera.

6. The method of claim 5, further comprising determining abnormalities in said flow meter based on said comparing step.

7. The method of claim 1, further comprising determining time intervals for periodically recording said meter display and transmitting said recording to said network.

8. A retrofit device adapted for installation to an autonomous, already installed flow meter including a meter display having a magnetic coupling, the retrofit device comprising:
one or more magnetic sensors positioned proximate said magnetic coupling and operative for detecting a variation in the strength of the magnetic field of the magnet coupling;
a controller connected to the magnetic sensors to determine rotation of the magnetic coupling over a time interval and compute flow volume through the flow meter for the time interval;
a camera positioned to record the meter display at the beginning and end of said time interval to generate a camera record,
whereby a flow volume of the flow meter can be determined from said camera record and compared with the computed flow volume by said controller.

9. The retrofit device of claim 8, whereby said retrofit device includes a ring adapter for mounting at least a portion of said device adjacent said meter display.

10. The retrofit device of claim 8, whereby said retrofit device includes an autonomous power source.

11. The retrofit device of claim 8, whereby said retrofit device includes a network connection.

12. The retrofit device of claim 8, wherein the comparison of the computed flow volume with the flow volume determined from said camera record is used to diagnose errors in the flow meter.

13. The retrofit device of claim 12, wherein the errors include one or more of: misalignment or deformation of said magnetic coupling; backpressure in a pipe; meter display error or failure; debris or sediment build up in the flow meter; gearbox blockage; or tamper attempts.

14. The retrofit device of claim 8, wherein the comparison of the computed flow volume with the flow volume determined from said camera record is used detect tampering with the flow meter.

15. A method of measuring fluid throughput through an already installed flow meter by observing mechanical components of the flow meter, the flow meter having a meter display and a magnetic coupling, the method comprising:
positioning one or more magnetic sensors proximate to said magnetic coupling to sense rotation of the magnetic coupling;
recording with the magnetic sensors a time series of signals indicative of the variation of strength of the magnetic field of the magnetic coupling;
analyzing the time series of signals to determine the number of rotations of the magnetic coupling that occur during a time interval;
calculating a flow volume of fluid flow through the flow meter over the time interval;
recording the meter display with a camera at the beginning and end of said time interval to generate a camera record, whereby the meter display indicates cumulative fluid flow;
determining fluid flow through the flow meter using the camera record; and
comparing the camera record fluid flow with the calculated flow volume.

16. The method of claim 15, including determining a flow rate of fluid through the flow meter.

17. The method of claim 15, including knowing a fluid flow of one rotation of the magnetic coupling to assist in said calculating a flow volume.

* * * * *